Jan. 27, 1970 W. C. FRESCH ET AL 3,492,654

HIGH SPEED MODULAR DATA PROCESSING SYSTEM

Filed May 29, 1967 22 Sheets-Sheet 1

INVENTORS.
WALTER C. FRESCH
BLAIR C. THOMPSON
LEROY W. BEERS
JAMES L. MURTAUGH, JR.

BY Edward J. Feeney Jr.
ATTORNEY

INVENTORS.
WALTER C. FRESCH
BLAIR C. THOMPSON
LEROY W. BEERS
JAMES L. MURTAUGH, JR.
BY Edward J. Feeney Jr.
ATTORNEY

HIGH SPEED MODULAR DATA PROCESSING SYSTEM

Filed May 29, 1967

INVENTORS.
WALTER C. FRESCH
BLAIR C. THOMPSON
LEROY W. BEERS
JAMES L. MURTAUGH, JR.

BY Edward J. Feeney Jr.
ATTORNEY

INVENTORS.
WALTER C. FRESH
BLAIR C. THOMPSON
LEROY W. BEERS
JAMES L. MURTAUGH, JR.
BY Edward J. Feeney Jr.
ATTORNEY

HIGH SPEED MODULAR DATA PROCESSING SYSTEM

Filed May 29, 1967 22 Sheets-Sheet 5

| PRIORITY | INTERRUPT CONDITION | INTERRUPT REGISTER BIT | COMPUTERS AFFECTED | BIT SET IN MODE | INTERRUPT RECOGNIZED IN MODE | MASK BITS LSR OPERAND | RESPONSE CONTROL MODE | RESPONSE NORMAL MODE |
|---|---|---|---|---|---|---|---|---|
| 1 | PRIMARY POWER FAILURE | – | ALL | – | NAB | NONE | AUTOMATIC STORE | AUTOMATIC STORE |
| 2 | COUNT REAL TIME CLOCK | – | ALL (INDIVIDUALLY) | – | NAB | NONE | RTC+1→RTC | RTC+1→RTC |
| 3 | RESTART AFTER PRIMARY POWER FAILURE | 1 | ALL | NAB | N | NONE | AUTOMATIC RESTORE | PROGRAM JUMP |
| 4 | EXTERNAL REQUEST | 2 | AVAILABLE | N | N | 21-36 | — | PROGRAM JUMP |
| 5 | INPUT/OUTPUT COMPLETE | 3 | AVAILABLE | NAB | N | 1-20 | — | PROGRAM JUMP |
| 6 | INTERRUPT BY ANOTHER COMPUTER | 4 | ONE | NAB | N | NONE | — | PROGRAM JUMP |
| 7 | REAL TIME CLOCK OVERFLOW | 5 | ONE | NAB | N | 41 | — | PROGRAM JUMP |
| 8 | WRITE OUT OF BOUNDS | 6 | ONE | N | N | NONE | — | PROGRAM JUMP |
| 9 | ILLEGAL INSTRUCTIONS | 7 | ONE | NAB | NAB | NONE | A-PROG. JUMP B-HALT | PROGRAM JUMP |
| 10 | NO ACCESS TO MEMORY | 8 | ONE | NAB | NAB | NONE | A-PROG. JUMP B-HALT | PROGRAM JUMP |
| 11 | ABNORMAL CONDITION | 9 | ONE | N | N | 43-45 | — | PROGRAM JUMP |
| 12 | HLT INSTRUCTIONS | 10 | ONE | N | N | NONE | HALT | PROGRAM JUMP |
| 13 | SNAG BIT | 11 | ONE | NAB | N | NONE | — | PROGRAM JUMP |
| 14 | PARITY ERROR | 12 | ONE | NAB | NAB | NONE | A-PROG. JUMP B-HALT | PROGRAM JUMP |

Fig. 5

INVENTORS.
WALTER C. FRESCH
BLAIR C. THOMPSON
LEROY W. BEERS
JAMES L. MURTAUGH, JR.
BY Edward J. Feeney Jr.
ATTORNEY INVENTORS.
WALTER C. FRESCH
BLAIR C. THOMPSON
LEROY W. BEERS
JAMES L. MURTAUGH, JR.
BY Edward J. Feeney Jr.
ATTORNEY

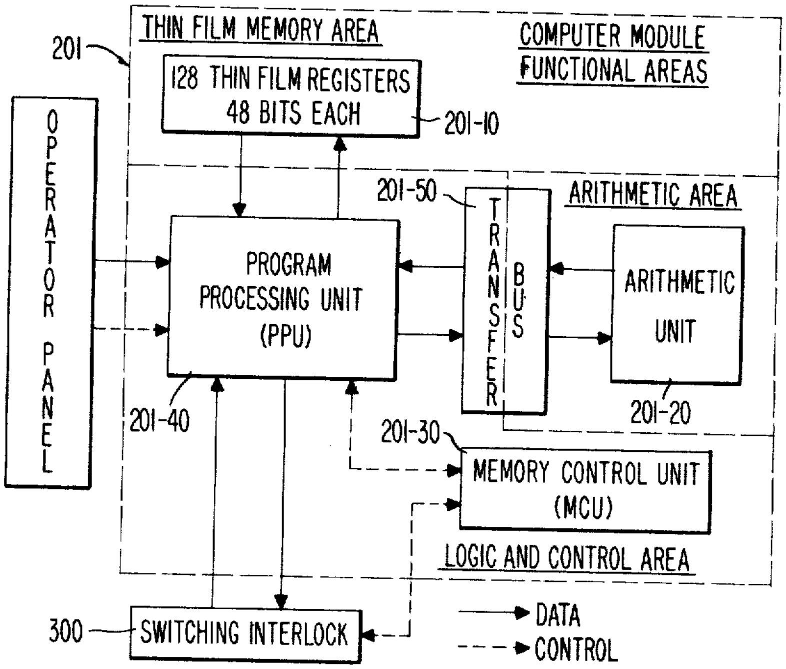
Fig. 12
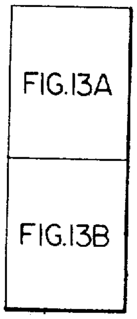
Fig. 13
Fig. 13A
| OCTAL CODE | 50 BIT REGISTERS | OCTAL CODE | 50 BIT REGISTERS |
|---|---|---|---|
| 000 | INDEX 0 | 100 | PSR1—PROGRAM STORAGE 1 |
| 001 | 1 | 101 | SPARE |
| 002 | 2 | 102 | |
| 003 | 3 | 103 | |
| 004 | 4 | 104 | PSR2—PROGRAM STORAGE 2 |
| 005 | 5 | 105 | SPARE |
| 006 | 6 | 106 | |
| 007 | 7 | 107 | |
| 010 | 8 | 110 | IPR—INTERRUPT PROGRAM |
| 011 | 9 | 111 | EAR*2-EFFECTIVE ADDRESS |
| 012 | 10 | 112 | BRR—BRANCH REFERENCE |
| 013 | 11 | 113 | EAR*1-EFFECTIVE ADDRESS |
| 014 | 12 | 114 | RTC—REAL TIME CLOCK |
| 015 | 13 | 115 | SPARE |
| 016 | 14 | 116 | |
| 017 | 15 | 117 | |
| 020 | LIMIT 0 | 120 | RCR—REPEAT COUNT |
| 021 | 1 | 121 | SPARE |
| 022 | 2 | 122 | XIR—INDEX INCREMENT |
| 023 | 3 | 123 | CCR—CHARACTER COUNT |
| 024 | 4 | 124 | TFC—THIN FILM C |

| | | | |
|---|---|---|---|
| 025 | 5 | 125 | SPARE |
| 026 | 6 | 126 | |
| 027 | 7 | 127 | |
| 030 | 8 | 130 | RIR-REPEAT INCREMENT |
| 031 | 9 | 131 | SPARE |
| 032 | 10 | 132 | |
| 033 | 11 | 133 | |
| 034 | 12 | 134 | |
| 035 | 13 | 135 | |
| 036 | 14 | 136 | |
| 037 | 15 | 137 | |
| 040 | DCR-DIVIDE COUNT | 140 | STACK 1 |
| 041 | RPR-REPEAT PROGRAM | 141 | SPARE |
| 042 | SPARE | 142 | |
| 043 | | 143 | |
| 044 | RAR-REPEAT ADDRESS | 144 | STACK 2 |
| 045 | | 145 | SPARE |
| 046 | | 146 | |
| 047 | SPARE | 147 | |
| 050 | SSA-SUBROUTINE STORAGE (BAR) | 150 | STACK 3 |
| 051 | SSP (BPR) | 151 | SPARE |
| 052 | SSC (PCR) | 152 | |
| 053 | SPARE | 153 | |
| 054 | BPR-BASE PROGRAM | 154 | STACK 4 |
| 055 | BAR-BASE ADDRESS | 155 | SPARE |
| 056 | SPARE | 156 | |
| 057 | PCR-PROGRAM COUNT | 157 | |
| 060 | SAR-SUBROUTINE BASE ADDRESS | 160 | |
| 061 | SPARE | 161 | |
| 062 | | 162 | |
| 063 | IARA-INTERRUPT A BASE ADDRESS | 163 | |
| 064 | PDR-POWER FAILURE DUMP | 164 | |
| 065 | SPARE | 165 | |
| 066 | | 166 | |
| 067 | IARB-INTERRUPT B BASE ADDRESS | 167 | |
| 070 | IDR-INTERRUPT DUMP | 170 | |
| 071 | SPARE | 171 | |
| 072 | | 172 | |
| 073 | | 173 | |
| 074 | ISA-INTERRUPT STORAGE (BAR) | 174 | |
| 075 | ISP (BPR) | 175 | |
| 076 | ISC (PCR) | 176 | |
| 077 | SPARE | 177 | |

Fig. 13B

Jan. 27, 1970 W. C. FRESCH ET AL 3,492,654

HIGH SPEED MODULAR DATA PROCESSING SYSTEM

Filed May 29, 1967 22 Sheets-Sheet 20

HIGH SPEED MODULAR DATA PROCESSING SYSTEM

Filed May 29, 1967

| Assembler Mnemonic | Assembler Format | Operation | Octal Code | Machine Code Mnemonic | Machine Code Syllable Format | Instruction Exec. Time |
|---|---|---|---|---|---|---|
| ABS | ABS $A_1, A_3$ | Set sign to plus | 34 | TRM | TRM $A_1, V, A_3$ | 1.5 |
| ABSR | ABSR $A_1, A_3$ | Set sign to plus and round | 34 | TRM | TRM $A_1, V, A_3$ | 1.5 |
| ADD | ADD $A_1, A_2, A_3$ | Binary ADD | 65 | BAD | BAD $A_1, A_2, A_3$ | 0.5 to 0.75 |
| AND | AND $A_1, A_2, A_3$ | Logical AND | 56 | LAN | LAN $A_1, A_2, A_3$ | 0.25 |
| CAND | CAND $A_1, A_3$, NNN[1] | Logical character AND | 47 | LAF | LAF $A_1, F, A_3$ | 1.5 |
| CCOM | CCOM $A_1, A_3$, NNN[2] | Logical character complement | 46 | LCF | LCF $A_1, F, A_3$ | 1.5 |
| CDA | CDA $A_1, A_3$, NNN[1] | Absolute character difference | 42 | BSF | BSF $A_1, F, A_3$ | 1.5 |
| CHB | CHB $A_1, NN_{10}, A_2$ | Change bit | 34 | TRM | TRM $A_1, V, A_3$ | 1.5 |
| CHBR | CHBR $A_1, NN_{10}, A_2$ | Change bit, round | 34 | TRM | TRM $A_1, V, A_3$ | 1.5 |
| CHS | CHS $A_1, A_3$ | Change sign | 34 | TRM | TRM $A_1, V, A_3$ | 1.5 |
| CHSR | CHSR $A_1, A_3$ | Change sign and round | 34 | TRM | TRM $A_1, V, A_3$ | 1.5 |
| COM | COM $A_1, A_3$ | Logical complement | 24 | LCM | LCM $A_1, A_3$ | 0.25 |
| COR | COR $A_1, A_3$, NNN[1] | Logical character OR | 44 | LOF | LOF $A_1, F, A_3$ | 1.5 |
| CORX | CORX $A_1, A_3$, NNN[1] | Logical character exclusive OR | 45 | LXF | LXF $A_1, F, A_3$ | 1.5 |
| CSA | CSA $A_1, A_3$, NNN[1] | Absolute character sum | 43 | BAF | BAF $A_1, F, A_3$ | 1.5 |
| CXS | CXS $A_1, A_3$, NNN[3] | Character extract and shift | 41 | SAF | SAF $A_1, F, A_3$ | 0.5 |
| DDV | DDV $A_1, A_2, A_3$ | Double length divide | 37 | DDV | DDV $A_1, A_2, A_3$ | 1.75 to 12.75 |
| DIV | DIV $A_1, A_2, A_3$ | Binary divide | 60 | BDV | BDV $A_1, A_2, A_3$ | 12.25 |
| DTEQ | DTEQ $X_n, N_{10}, L_n, B$ | Decrement and branch when $X_n = L_n$ | 12 | XLC | XLC $I_a, I_v, B$ | 2.0 |
| DTGE | DTGE $X_n, N_{10}, L_n, B$ | Decrement and branch when $X_n \geq L_n$ | 12 | XLC | XLC $I_a, I_v, B$ | 2.0 |
| DTGR | DTGR $X_n, N_{10}, L_n, B$ | Decrement and branch when $X_n > L_n$ | 12 | XLC | XLC $I_a, I_v, B$ | 2.0 |
| DTLE | DTLE $X_n, N_{10}, L_n, B$ | Decrement and branch when $X_n \leq L_n$ | 12 | XLC | XLC $I_a, I_v, B$ | 2.0 |
| DTLS | DTLS $X_n, N_{10}, L_n, B$ | Decrement and branch when $X_n \leq L_n$ | 12 | XLC | XLC $I_a, I_v, B$ | 2.0 |
| DTUE | DTUE $X_n, N_{10}, L_n, B$ | Decrement and branch when $X_n \neq L_n$ | 12 | XLC | XLC $I_a, I_v, B$ | 2.0 |
| DXR | DXR $X_n, N_{10}$ | Decrement only | 12 | XLC | XLC $I_a, I_v, B$ | 2.0 |
| EXC | EXC | Single repeat | 10 | RPT | RPT $R_c, R_i, T$ | 0.0 |
| FAD | FAD $A_1, A_2, A_3$ | Floating ADD | 67 | FAD | FAD $A_1, A_2, A_3$ | 2.75 to 4.75 |
| FDV | FDV $A_1, A_2, A_3$ | Floating divide | 62 | FDV | FDV $A_1, A_2, A_3$ | 10.5 |
| FLT | FLT $A_1, A_3$ | Convert binary to floating | 25 | CBF | CBF $A_1, A_3$ | 0.25 to 5.0 |
| FMU | FMU $A_1, A_2, A_3$ | Floating multiply | 63 | FMU | FMU $A_1, A_2, A_3$ | 10.25 |
| FSU | FSU $A_1, A_2, A_3$ | Floating subtract | 66 | FSU | FSU $A_1, A_2, A_3$ | 2.75 to 4.75 |
| FTF | FTF TF, TF | Thin-film transfer | 15 | STF | STF TF, TF | 0.75 to 2.0 |
| HLT | HLT | Halt | 01 | HLT | HLT | 0.25 |
| IDV | IDV $A_1, A_2, A_3$ | Integer divide | 33 | IDV | IDV $A_1, A_2, A_3$ | 12.75 |
| IMU | IMU $A_1, A_2, A_3$ | Integer multiply | 23 | IMU | IMU $A_1, A_2, A_3$ | 12.25 |
| IOC | IOC $A_1$, B, A or B | Transmit I/O | 16 | TIO | TIO I/O, $A_2$, B | 0.0 |
| IORL | IORL $A_1$, B, A or B | Transmit I/O | 16 | TIO | TIO I/O, $A_2$, B | 0.0 |
| IOS | IOS $A_1$, B, A or B | Transmit I/O | 16 | TIO | TIO I/O, $A_3$, B | 0.0 |
| IRN | IRN N | Interrupt computer N | 31 | LSR | LSR $A_1, V_a$ | 0.0 |
| IRR | IRR | Interrupt return | 05 | IRR | IRR | 2.25 |
| ITEQ | ITEQ $X_n, N_{10}, L_n, B$ | Increment and branch on $X_n = L_n$ | 12 | XLC | XLC $I_a, I_v, B$ | 2.0 |
| ITGE | ITGE $X_n, N_{10}, L_n, B$ | Increment and branch on $X_n \geq L_n$ | 12 | XLC | XLC $I_a, I_v, B$ | 2.0 |
| ITGR | ITGR $X_n, N_{10}, L_n, B$ | Increment and branch on $X_n > L_n$ | 12 | XLC | XLC $I_a, I_v, B$ | 2.0 |
| ITLE | ITLE $X_n, N_{10}, L_n, B$ | Increment and branch on $X_n \leq L_n$ | 12 | XLC | XLC $I_a, I_v, B$ | 2.0 |
| ITLS | ITLS $X_n, N_{10}, L_n, B$ | Increment and branch on $X_n < L_n$ | 12 | XLC | XLC $I_a, I_v, B$ | 2.0 |
| ITUE | ITUE $X_n, N_{10}, L_n, B$ | Increment and branch on $X_n \neq L_n$ | 12 | XLC | XLC $I_a, I_v, B$ | 2.0 |
| IXR | IXR $X_n, N_{10}$ | Increment only | 12 | XLC | XLC $I_a, I_v, B$ | 2.0 |
| LSR | LSR $A_1$, MASK<br>LSR $A_1$, MBR | Load mask register<br>Load memory bounds register | 31 | LSR | LSR $A_1, V_a$ | 0.50 |
| LTF | LTF $A_1$, TF | Load thin film | 30 | LTF | LTF $A_1$, TF | 0.25 to 0.75 |
| MOVE | MOVE $A_1, A_3$ | Transmit | 35 | TRS | TRS $A_1, A_3$ | 0.0 |

Fig. 18A

| Assembler Mnemonic | Assembler Format | | Operation | Octal Code | Machine Code Mnemonic | Machine Code Syllable Format | Instruction Exec. Time |
|---|---|---|---|---|---|---|---|
| MUL | MUL | $A_1, A_2, A_3$ | Binary multiply | 61 | BMU | BMU $A_1, A_2, A_3$ | 12.25 |
| NEG | NEG | $A_1, A_3$ | Set sign to minus | 34 | TRM | TRM $A_1$, V, $A_3$ | 1.5 |
| NEGR | NEGR | $A_1, A_3$ | Set sign to minus and round | 34 | TRM | TRM $A_1$, V, $A_3$ | 1.5 |
| NOP | NOP | | No operation | 00 | NOP | NOP | 0.25 |
| OR | OR | $A_1, A_2, A_3$ | Logical OR | 55 | LOR | LOR $A_1, A_2, A_3$ | 0.25 |
| ORX | ORX | $A_1, A_2, A_3$ | Logical OR exclusive | 54 | LXR | LXR $A_1, A_2, A_3$ | 1.0 |
| RET | RET[4] | | Subroutine return | 04 | SRR | SRR | 1.75 |
| RFS | RFS | B, $N_1, N_2, N_3, N_4$ | Repeat four syllables | 13 | RFS | RFS $R_c$, $R_i$, T | 0.0 |
| RND | RND | $A_1, A_3$ | Number rounded | 34 | TRM | TRM $A_1$, V, $A_3$ | 1.5 |
| RPT | RPT | T, $A_2, N_{10}, N_{10}, N_{10}, N_{10}$ | Multiple repeat | 10 | RPT | RPT $R_c$, $R_i$, T | 0.0 |
| RRPT | RRPT | B | Resume repeat | 17 | RRP | RRP A | 0.0 |
| RSD | RSD | | Reverse stack | 06 | RVS | RVS | 0.25 |
| SBF | SBF | $A_1$, $NN_{10}$, $A_2$ | Set bit off | 34 | TRM | TRM $A_1$, V, $A_3$ | 1.5 |
| SBFR | SBFR | $A_1$, $NN_{10}$, A2 | Set bit off, round | 34 | TRM | TRM $A_1$, V, $A_3$ | 1.5 |
| SBN | SBN | $A_1$, $NN_{10}$, $A_2$ | Set bit on | 34 | TRM | TRM $A_1$, V, $A_3$ | 1.5 |
| SBNR | SBNR | $A_1$, $NN_{10}$, $A_2$ | Set bit on, round | 34 | TRM | TRM $A_1$, V, $A_3$ | 1.5 |
| SCI | SCI | $A_1$, $A_3$, NNN[5] | Stack character insert | 40 | AIF | AIF $A_1$, F, $A_3$ | 0.5 |
| SER | SER | $A_3$ | Store external request | 21 | SER | SER $A_3$ | 0.0 |
| SLT | SLT | $A_1$, $A_3$, D, L, C, $N_{10}$ | Shift left | 36 | SHF | SHF $A_1$, $V_t$, $A_3$ | 0.25/1.5 |
| SRT | SRT | $A_1$, $A_3$, D, L, C, $N_{10}$ | Shift right | 36 | SHF | SHF $A_1$, $V_t$, $A_3$ | 0.25/1.5 |
| SSF | SSF | | Step stack fetch | 02 | SSU | SSU | 0.25 |
| SSS | SSS | | Step stack store | 03 | SSD | SSD | 0.25 |
| STF | STF | TF, $A_3$ | Store thin film | 15 | STF | STF TF, $A_3$ | 0.5 to 1.25 |
| STZ | STZ | $A_3$ | Store zero | 20 | CLA | CLA $A_3$ | 0.0 |
| SUB | SUB | $A_1, A_2, A_3$ | Binary subtract | 64 | BSU | BSU $A_1, A_2, A_3$ | 0.5 to 0.75 |
| TBOF | TBOF | $A_1$, $NN_{10}$, B | Transfer, bit set | 27 | BSB | BSB $A_1$, $V_b$, B | 0.75 |
| TBON | TBON | $A_1$, $NN_{10}$, B | Transfer, bit reset | 27 | BSB | BSB $A_1$, $V_b$, B | 0.75 |
| TCE | TCE | $A_1$, B, NNN[6] | Transfer on character equal | 52 | CEF | CEF $A_1$, F, B | 1.0 |
| TCG | TCG | $A_1$, B, NNN[6] | Transfer on character greater | 51 | CGF | CGF $A_1$, F, B | 1.0 |
| TCL | TCL | $A_1$, B, NNN[6] | Transfer on character less | 50 | CLF | CLF $A_1$, F, B | 1.0 |
| TEQ | TEQ | $A_1$, $A_2$, B | Transfer on equal | 76 | CEQ | CEQ $A_1$, $A_2$, B | 1.0 |
| TGF | TGF | $A_1$, $A_2$, B | Floating compare greater | 53 | FCG | FCG $A_1$, $A_2$, B | 0.75 to 1.25 |
| TGL | TGL | $A_1$, $A_2$, B | Transfer on logical greater | 71 | ACG | ACG $A_1$, $A_2$, B | 1.0 |
| TGR | TGR | $A_1$, $A_2$, B | Transfer on greater | 75 | CGR | CGR $A_1$, $A_2$, B | 1.0 |
| TIC | TIC | $A_1$, C or $NN_8$, B | Transfer on imbedded character | 32 | CSE | CSE $A_1$, C, B | 1.5 to 3.25 |
| TICL | TICL | $A_1$, C or $NN_8$, B | Transfer on character, right scan | 32 | CSE | CSE $A_1$, C, B | |
| TICR | TICR | $A_1$, C or $NN_8$, B | Transfer on character, left scan | 32 | CSE | CSE $A_1$, C, B | |
| TLF | TLF | $A_1$, $A_2$, B | Floating compare less | 73 | FCL | FCL $A_1$, $A_2$, B | 0.75 to 1.25 |
| TLL | TLL | $A_1$, $A_2$, B | Transfer on logical less | 70 | ACL | ACL $A_1$, $A_2$, B | 1.0 |
| TLS | TLS | $A_1$, $A_2$, B | Transfer on less | 74 | CLS | CLS $A_1$, $A_2$, B | 1.0 |
| TNN | TNN | B | Transfer on non-normal | 11 | BRC | BRC L, B | 0.25 |
| TOD | TOD | $A_1$, $A_3$, B | Transfer on least bit | 26 | BRB | BRB $A_1$, $A_3$, B | 0.5 |
| TOV | TOV | B | Transfer on overflow | 11 | BRC | BRC L, B | 0.25 |
| TRA | TRA | B | Unconditional transfer | 22 | UCT | UCT $A_3$ | 0.0 |
| TSUB | TSUB | $A_1$, $N_{10}$[7] | Subroutine jump | 14 | SRJ | SRJ $J_a$, $J_i$ | 3.0 |
| TUN | TUN | B | Transfer on underflow | 11 | BRC | BRC L, B | 0.25 |
| TUE | TUE | $A_1$, $A_2$, B | Compare unequal | 72 | CUN | CUN $A_1$, $A_2$, B | 1.0 |
| TXD | TXD | $X_n$, $N_{10}$, B | Decrement and branch | 12 | XLC | XLC $I_a$, $I_v$, B | 2.0 |
| TXEQ | TXEQ | $X_n$, $N_{10}$, B | Branch on $X_n = L_n$ | 12 | XLC | XLC $I_a$, $I_v$, B | 2.0 |
| TXGE | TXGE | $X_n$, $N_{10}$, B | Branch on $X_n \geq L_n$ | 12 | XLC | XLC $I_a$, $I_v$, B | 2.0 |
| TXGR | TXGR | $X_n$, $N_{10}$, B | Branch on $X_n > L_n$ | 12 | XLC | XLC $I_a$, $I_v$, B | 2.0 |
| TXI | TXI | $X_n$, $N_{10}$, B | Increment and branch | 12 | XLC | XLC $I_a$, $I_v$, B | 2.0 |
| TXLE | TXLE | $X_n$, $N_{10}$, B | Branch on $X_n \leq L_n$ | 12 | XLC | XLC $I_a$, $I_v$, B | 2.0 |
| TXLS | TXLS | $X_n$, $N_{10}$, B | Branch on $X_n < L_n$ | 12 | XLC | XLC $I_a$, $I_v$, B | 2.0 |
| TXUE | TXUE | $X_n$, $N_{10}$, B | Branch on $X_n \neq L_n$ | 12 | XLC | XLC $I_a$, $I_v$, B | 2.0 |

Fig. 18B

SYMBOL DESIGNATIONS $A_1$ = OPERAND 1 ADDRESS
A2 = OPERAND 2 ADDRESS
A3 = OPERAND RESULT ADDRESS
B = BRANCH ADDRESS
C = CHARACTER OR OCTAL NUMBER
$I_a$ = AMOUNT INDEX REGISTER CHANGED
$I_v$ = SPECIFIED INDEX & LIMIT REGISTERS, BRANCH CONDITION, & WHETHER INDEX REGISTER IS INCREASED OR DECREASED
I/O = SPECIAL I/O SYLLABLE
$J_a$ = JUMP ADDRESS SYLLABLE
$V_b$ = BIT VARIANT
$J_i$ = JUMP INCREMENT SYLLABLE
L = BRANCH CONDITION SYLLABLE
$L_\eta$ = LIMIT REGISTER
N = OCTAL NUMBER
$N_{10}$ = DECIMAL NUMBER
$R_c$ = NUMBER OF TIMES AN OPERATION IS REPEATED
$R_i$ = INCREMENT AMOUNT WHEN REPEATED
T = TAG ADDRESS OF NEXT INSTRUCTION
TF = THIN FILM ADDRESS
V = VARIANT
$X_\eta$ = INDEX REGISTER 3,492,654

HIGH SPEED MODULAR DATA PROCESSING SYSTEM

Walter C. Fresch, Phoenixville, Blair C. Thompson, King of Prussia, Leroy W. Beers, Downingtown, and James L. Murtaugh, Jr., West Chester, Pa., assignors to Burroughs Corporation, Detroit, Mich., a corporation of Michigan Filed May 29, 1967, Ser. No. 641,878
Int. Cl. G11b *13/00;* G06f *1/00, 7/00*
U.S. Cl. 340—172.5 14 Claims

ABSTRACT OF THE DISCLOSURE

A high speed modular data processing system is disclosed having one or more unique processing modules and one or more novel input/output control modules. The new processing and input/output control modules combine to utilize a high speed core memory in an extremely efficient manner. Each of the processing modules and each of the input/output control modules include means to enable simultaneous processing of a plurality of portions of a particular program.

CROSS REFERENCES TO RELATED APPLICATION

There are presently pending in the Patent Office, two applications which relate to the subject matter of the present disclosure. They are (1) A Modular Computer System by James P. Anderson et al., Ser. No. 246,855, filed Nov. 30, 1962 and (2) A Modular Multicomputing Data Processing System by John T. Lynch et al., Ser. No. 509,719, filed Nov. 26, 1965. Both of these co-pending applications are assigned to the assignee of the present application.

BACKGROUND OF THE INVENTION

Field of the invention

The present invention relates to a high speed modular data processing system having a plurality of functional modules. More particularly, it relates to a modular data processing system having a high speed main memory with an improved central processing module(s) and an improved input/output control module(s).

Description of the prior art

Achievements in the development of logic elements and circuits have brought the present-day high-speed computing system steadily closer to an almost ludicrous dilemma. Thus, improved arithmetic circuits using the most advanced logical elements perform their functions in single, stunning bursts of signal propagation, and there after patiently wait relatively long periods, either for the transfer of input/output information or, to an increasing extent, for the transfer of the next instruction from the main memory of the system.

These speed limitations have been known since the outset of computer system development and while they remain a serious drawback, many previous approaches have provided considerable relief. For example, well-known benefits have been drawn from previous provisions for concurrent module operations within a system. More recently efficiency of operation on a wholly new level was accomplished in a self-scheduling multicomputer system wherein the plurality of computer modules shared a common memory and a common I/O complement.

However, in spite of these advances in computer concept and system organization, the speed limitations imposed by the main memory cycle time has steadily approached the intolerable. Since ferrite cores were used in most large-capacity, main memory applications, many previous attempts were made to increase their switching speeds. However, at least in practical systems, these efforts fell far short of the logical propagation rates presently available. High-speed memories using faster storage elements, such as superconducting cells, magnetic twistors, magnetic thin films, and ferrite plates, which were expected to have supplanted large-capacity core storage several years ago, have been slow in arriving. Most attempts to produce even small capacity memories, using these high-speed alternatives have met with considerable difficulty. However, a few modest-sized, high speed memory units have been constructed successfully. For example, the system described in the first co-pending application referred to above utilized a small magnetic thin-film memory device in each of its computer modules. Other computer systems employing somewhat similar small, thin-film stores, have also been announced. Such memories were usually referred to as "scratch pad" memories.

As the name implied, these units were usually utilized by the computing portion of the processing system as it performed its arithmetic manipulations. For example, they were used to provide temporary storage for intermediate results obtained during a lengthy arithmetic computation. Another use was the storage of often-used mathematical information. This enabled the computational unit to operate more efficiently, since this information could be more rapidly stored or made available in the reduced retrieval time of this smaller, higher-speed memory. This, of course, was a considerable improvement; however, the basic system problem had not been overcome. The comparatively long cycle time of the large-capacity main memory remained a system encumbrance which ultimately had to be faced.

SUMMARY

The present invention provides a computer system which eliminates the problem of main memory access speed as a system limitation. This has been accomplished basically by the creation of a data processing system having a high-speed main memory.

However, as might be expected, in the case where a long endured limitation is overcome, the present system includes additional advantages which are not immediately apparent, nor, in fact, to be expected.

For example, with this limitation removed, the sophisticated approaches which were previously included to submerge the problem were no longer necessary. Consequently, immediate simplifications became possible and previous efforts at devious sophistication could now be directed toward more immediate rewards.

Further, the improved performance offered by advanced logical circuitry and new components, which heretofore could only partially be realized now could be fully appreciated. Thus, in addition to providing a system which has eliminated the speed limitations heretofore considered inherent in any large-capacity main memory, the present system also includes a number of new concepts which more fully exploit these newly available speed capabilities.

It is, therefore, a basic object of the present invention to provide an improved multicomputer modular data processing system, the operational speed of whose main memory is such that it can supply storage and retrieve requests as fast as the remainder of the system can utilize them.

It is a further object of this invention to provide an improved computer module for such a system wherein the computer module has processing and storage means including arithmetic, logic and thin-film memory circuitry which is capable of utilizing the system main memory at a higher rate than previously known processing systems.

It is also an object of this invention to provide an improved input/output control module for the present data processing system wherein each of the input/output control modules is capable of utilizing such a memory more efficiently.

It is also an object of this invention to provide a data processing system having an improved automatic interrupt control system which provides means for further interruption of system operation during the period the system is operating upon a previous interrupt condition.

Other objects will become apparent upon consideration of the remainder of this specification with the accompanying drawings. A specific embodiment, contemplated by the inventors to be the best mode of carrying out their invention, is set forth in the following detailed description. The reference letters and numerals noted therein refer to different views of the drawings and similar segments have been given corresponding connotations.

BRIEF DESCRIPTION OF THE DRAWINGS

FIG. 5 is a chart of all system interrupt signals showing their individual characteristics.

FIG. 12 is a functional block diagram of an individual Computer Module showing its thin-film memory area, its arithmetic area and its logic/control area.

FIG. 13 includes FIGS. 13A and 13B and is a map which identifies the address locations of the thin-film memory area of the Computer Module of FIG. 12.

FIGS. 18A and 18B taken together include a complete list of the present instructions used by the system.

DESCRIPTION OF THE PREFERRED EMBODIMENT

The following description thereof discloses a modular data processing system believed to be the first full-scale system to employ both magnetic core and magnetic thin-film memory devices as the basic storage elements of its main memory to thereby provide a system whose operational speed is not restricted by the cycling speed of its main memory.

Figure 1:
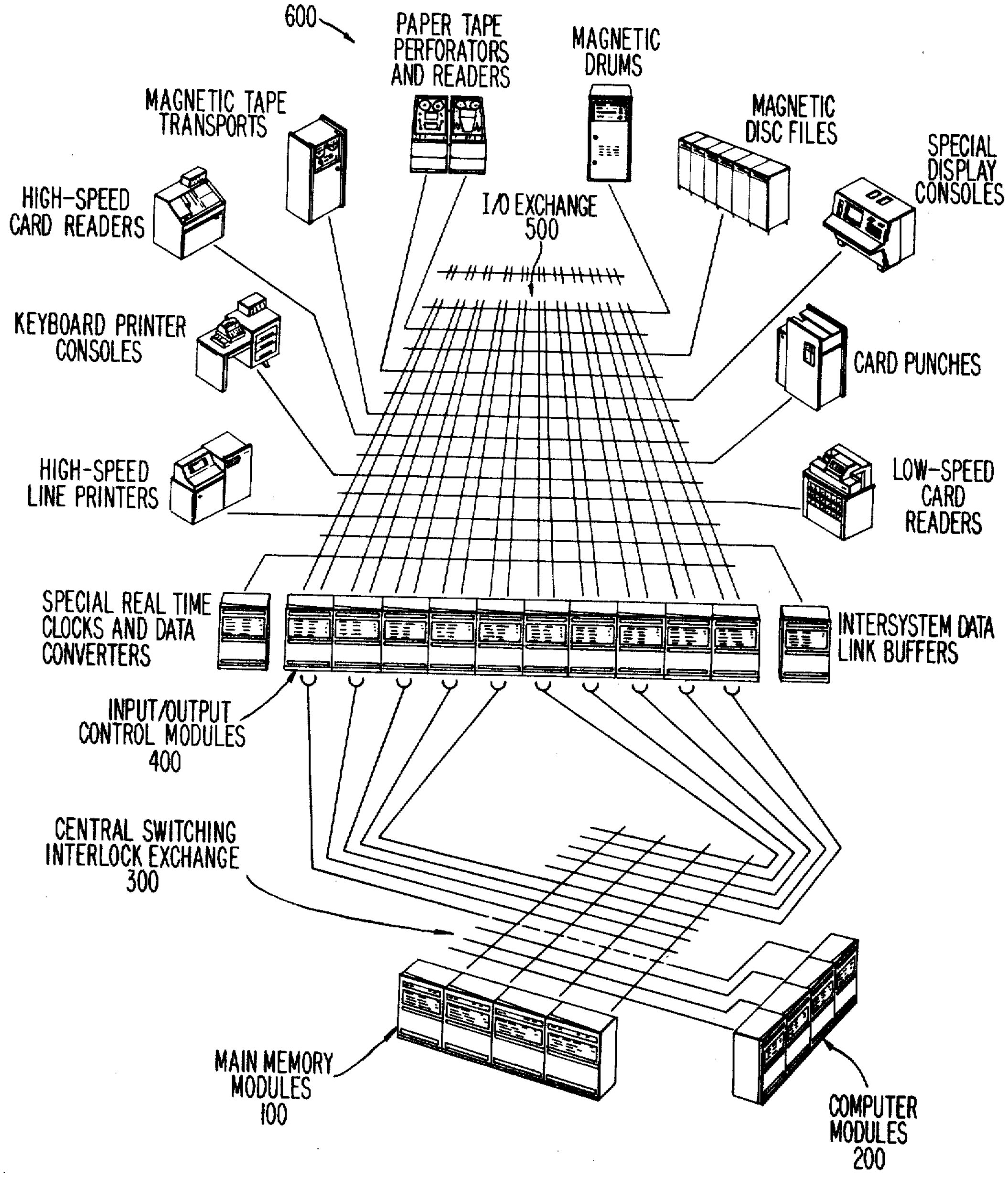
FIG. 1 is a pictorial diagram of a proposed maximum system organization.

For purposes of explanation, the reference numeral sequence in succeeding figures has been logically expanded from those used in FIG. 1. Thus the Computer Modules generally referenced as 200 in FIG. 1 are denoted more specifically in FIG. 2 as 201, 202, etc.

Referring in particular to FIG. 1, there is shown a pictorial representation of an embodiment of the present modular data processing system. The system is divided by dashed lines to illustrate its main portions. The main memory portion 100 is connected by a plurality of separate communicating connections through a central exchange switching interlock 300 to the processing or computing portion 200. Peripheral device information is managed by an input/output control portion 400 which is similarly connected through the central exchange interlock 300 to the main memory portion 100. An input/output exchange 500, much like the central exchange 300, is connected between the control portion 400 and the peripheral devices 600. The central exchange 300 provides a means of simultaneous communication between each of the Memory Modules of the main memory 100 and an equal number of separate Computer Modules of the processing portion 200 and I/O Control Modules of the I/O control portion 400.

Figure 2:
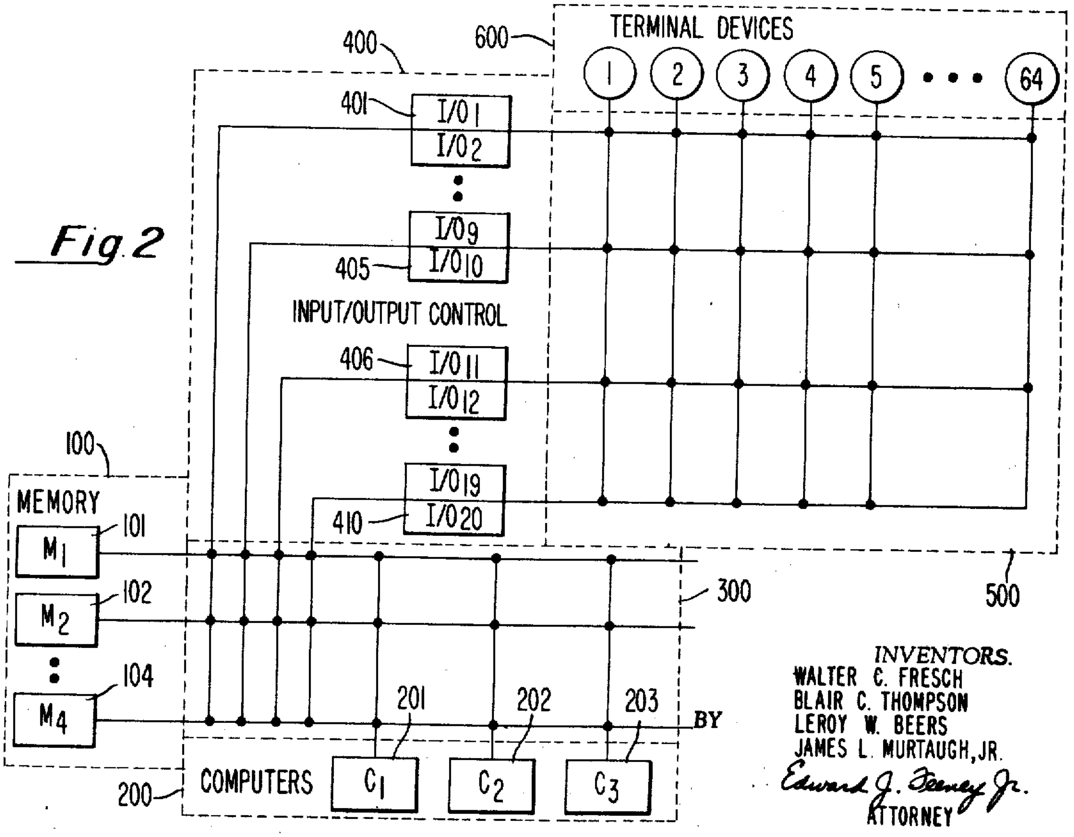
FIG. 2 is a block diagram of a typical system configuration.

Considered next FIG. 2, which illustrates in a more detailed block diagream the modular configuration of the present system. In this figure, each of the modules is individually referenced as a block. Thus, the four Memory Modules are noted as 101 to 104. The three Computer Modules 201, 202, 203 and the ten Input/Output Control Modules 401 to 410 are all connected through the central interchange 300 to each of these Memory Modules. It is also shown that each of the I/O Control Modules is further divided into two control units, making a total of twenty I/O control units. All I/O Control Modules are connected through an input/output network 500 to a plurality of sixty-four peripheral devices 600. These devices may be thirty-two simple input and thirty-two simple output or thirty-two complex devices or combinations of simple and complex devices.

Figure 3:
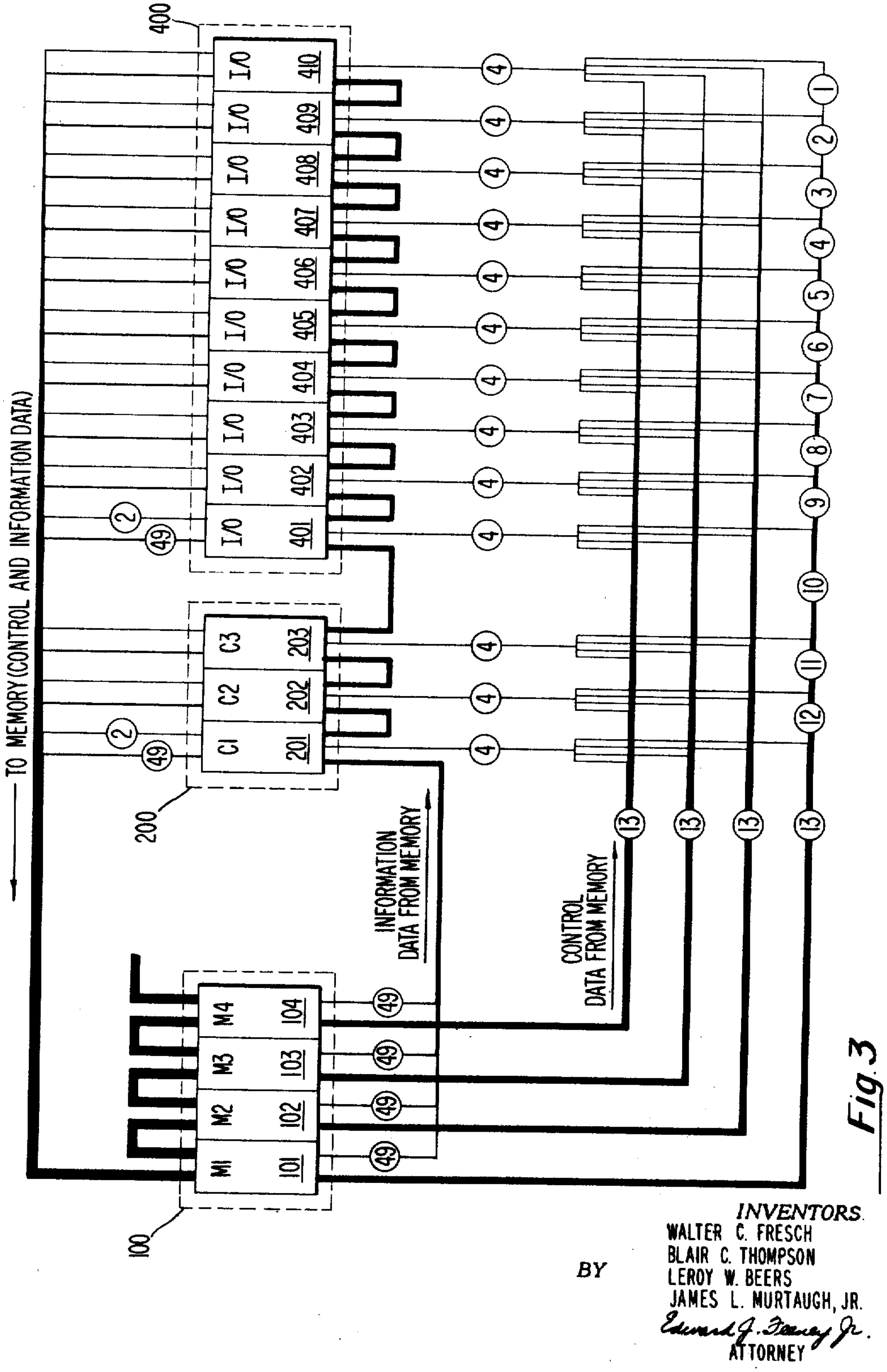
FIG. 3 is a simplified wiring diagram showing the basic intermodule connections of a typical system configuration.

FIG. 3 is a simplified cabling diagram of the central interchange 300 showing the modules of the system and their respective system interconnections. The encircled numerals denote the number of lines in the cable. Consider first the data leaving the memory as information. This information is conducted through the 49 line cables shown emanating from the lower portion of each of the Memory Modules 101 to 104. The combined group of cables are noted as Information Data From Memory. This group of four 49-line cables is shown as a heavy dark line of uniform width which is successively connected to each of the remaining thirteen modules 201–203, 401–410 in the system. The initial connection is shown as to Computer Module 201; however, no particular order is necessary.

Control of the information data flowing along these four 49-line cables is exercised by a group of four 13-line cables, one cable coming from each of the four Memory Modules. These four cables are denoted as carrying Control Data From Memory, and it is the signals along this group of cables which direct the information data flow from a particular one of the four Memory Modules 101–104 to a particular one of the thirteen remaining system modules 201–203, 401–410. This remaining group might also be referred to generally as nonmemory modules since they are not part of the main memory. Another term might be memory-user modules.

It is important to observe that the 13-wire control cable from each of the four Memory Modules 101 to 104 is connected to the remaining modules in a completely different manner than the 49-line cable previously discussed. Each Memory Module in the system is connected separately through a single control line to every nonmemory module. Thus, one of the 13 wires from Memory Module 101 is connected to Computer Module 201, another is connected to Computer Module 202, and so forth. This continues until each of the 13 wires from the Memory Module 101 is connected to another separate nonmemory module. This connection scheme is repeated for each of the remaining Memory Modules, 102 to 104. The end result is a group of 13 cables of 4 wires each. One four wire cable is connected to each of the three Computer Modules 201 to 203 and to each of the ten I/O Module cabinets 401 to 410 as shown in the lower portion of FIG. 3.

Consider next the input cables to the four Memory Modules shown in FIG. 3. This connection is accomplished in still another manner. The information data to Memory is again transferred by a 49-line cable; however, in this case, each of the thirteen nonmemory modules connects its own separate 49-line cable to the Memory Module 101. Further, each of these thirteen modules 201–203, 401–410, connects its own control cable to the Memory Module 101. However, in this case, the three control cables from the Computer Modules 201, 202 and 203 and the control cables from the ten I/O Control Modules 401 to 410 have two lines. Therefore, as shown in FIG. 3, there are twenty-six cables connected to the Memory Module 101, of which thirteen are 49-line information data cables and thirteen are 2-line control data cables from the I/O Control Module Cabinets 401–410 and the Computer Modules 201, 202 and 203. These twenty-six cables are consecutively connected to each succeeding Memory Module 102 through 104. Since each Memory Module is merely connected to the preceding one, it is seen that this 26-cable group, as well as the four 49-line information cable group and the four 13-line control cable group from the Memory Modules 101–104, is created as required by the size of the system. In other words, the central exchange 300 shown in FIG. 1, is actually created by the cables just described. It does not exist as a separate physical entity, rather it is automatically created by the modular interconnection. Consequently, it automatically adjusts to conform to changes in the size of the system as modules are added or removed.

Figure 4:
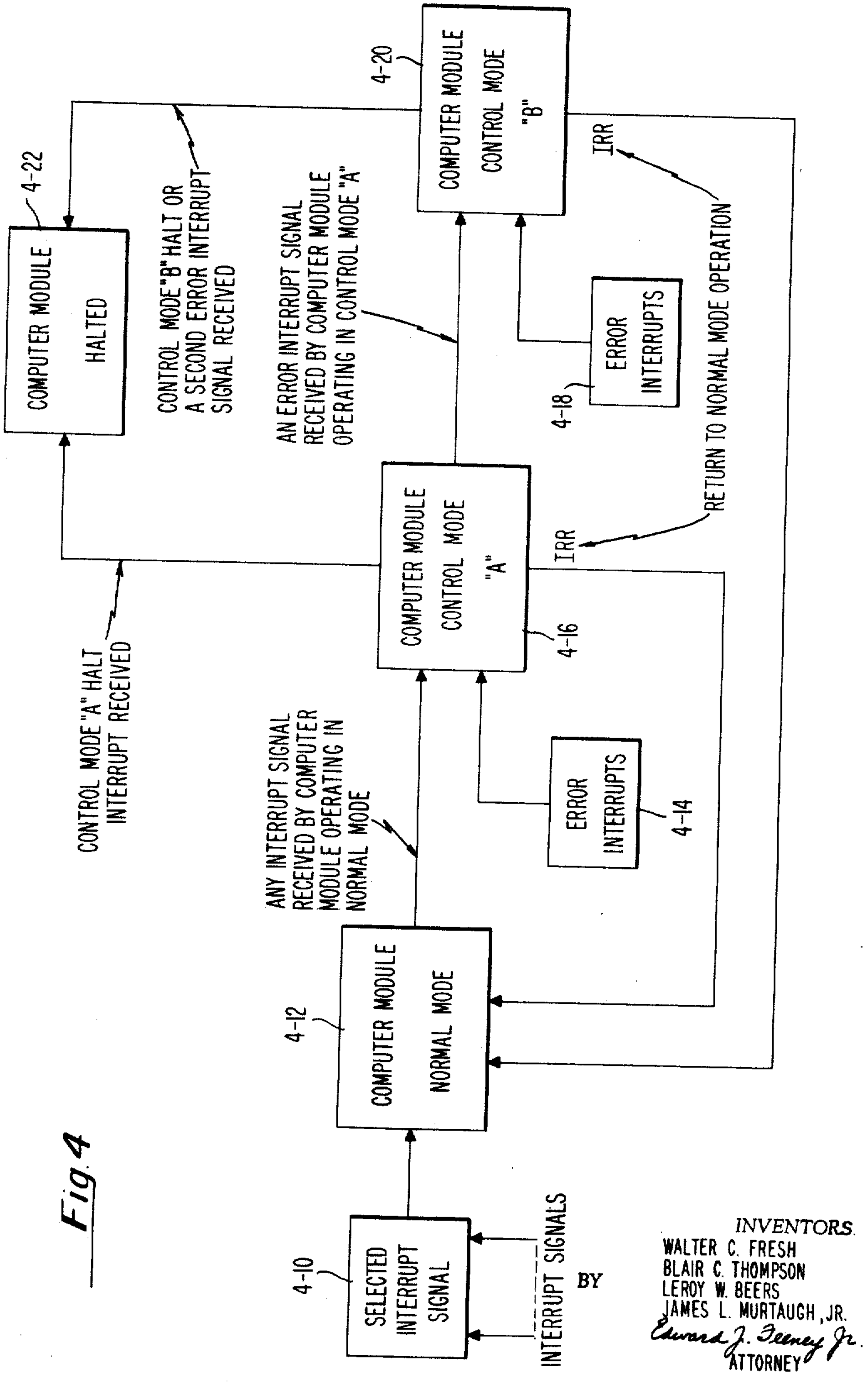
FIG. 4 is a functional block diagram of the Computer Module operational modes under control of the interrupt signals.

Refer next to FIG. 4. It illustrates the interrupt control system embodied in the present data processor. A somewhat similiar interrupt system was previously disclosed in a recently issued patent entitled "Automatic Interrupt System for a Data Processor," U.S. Patent No. 3,286,239, by Blair C. Thompson et al., filed Nov. 30, 1962 and assigned to the present assignee. However, the present embodiment is an improvement upon that earlier disclosed system. This system not only detects malfunctions and unique conditions and corrects or responds to these conditions as did the previously disclosed system, but in addition, it also attempts to protect the data processing system from total failure without halting all processing. Basically this is achieved by having the Computer Module recognize error interrupt signals when the module is already operating in its interrupt mode. The present system, then, not only operates in a normal and an interrupt (control) mode as did the system described earlier, but further it operates in still another interrupt mode.

It should be noted that the term "interrupt" when used herein is not used in its usual sense to denote suspension or cessation, but, rather, it is used to specify a shift or transfer. In other words, it may be considered as a request to the Computer Module to transfer its attention from one program to another as directed by the hardware of the interrupt system. These requests may be initiated internally (within each of the Computer Modules) or externally (from the other modules of the system).

In FIG. 4, an interrupt signal selection means 4–10 receives all of the interrupt signals and selects one for consideration by the Computer Module 4–12. It should be pointed out that although this selection means 4–10 is shown separately, it is actually internal to the Computer Module 4–12 and is illustrated here for ease of explanation. Further, while there are a number of Computer Modules shown in FIG. 4, it is understood, of course, that they merely pictorially represent the different modes of operation. That is, they are not physically different modules, but rather, the same module in different operational modes.

As previously noted, a Computer Module 4–12 responds to the reception of an interrupt signal by shifting its mode of operation. A Computer Module operating in the normal mode will be executing the steps of an object program. The reception of a selected interrupt signal at this time will cause the Computer Module to transfer its attention (operation) to a control assignment. This operational shift is referred to as a transfer from operation in the Normal mode to operation in the Control mode. The first Control mode is specified as Control Mode A, 4–16 in the present description to differentiate it from the second Control mode B, 4–20.

Returning to the pictorial block diagram of FIG. 4, the selection of an interrupt signal by the means 4–10 when the Computer Module 4–12 is operating in the Normal (N) mode causes it to undergo an operational mode shift to Control Mode "A" 4–16. In this condition the Computer Module will execute one of a group of appropriate control programs associated with each of the interrupt conditions. These programs are located in particular portions of the main memory. They are referred to herein collectively as the Control mode A interrupt table. In addition to the remedial and checking programs usually associated with the term "interrupt," additional programs are included to direct all control functions required by the system. Thus all I/O operations are initiated by the use of an interrupt control signal and further, the completion of such operations is recognized by their use.

For all signals the Computer Module will service the interrupt signal and thereafter return itself to its N mode by creating an interrupt return signal IRR. Upon its return to Normal mode processing, it recovers from its own thin-film memory the information it had stored upon receipt of the interrupt signal. This information so stored includes all of the necessary information required to restore processing to the point in the program at which the interruption occurred.

Returning again to the discussion of FIG. 4, if, while the Computer Module is operating in the Control mode A 4–16, it receives an interrupt signal which indicates that an error has occurred, it shifts to still another operational mode, herein called the Control mode B. This is shown symbolically in FIG. 4, by the block 4–20. In this later Control mode the Computer Module executes programs located in still another table. This table is referred to as the Control mode B interrupt table and includes only programs having a remedial purpose, since only an error interruption can cause such an operational shift. Here again, the Computer Module will return from its B mode 4–20 to its N mode 4–12, when it has concluded the execution of the appropriate remedial program. However, if, while in the B mode 4–20, it receives still another interruption signal which indicates error has occurred during the execution of the remedial program, or which directs the Computer Module to halt processing, then the module will react accordingly and halt processing 4–22. The advantage of this feature immediately becomes obvious when it is considered that without it, the Computer Module would continue to execute the remedial program even though the orders given therein were erroneous. Of course, as indicated in FIG. 4, if, while the Computer Module is operating in the A mode 4–16, it receives an interruption signal directing it to halt processing, it will likewise comply by proceeding immediately to the halted condition 4–22 rather than shifting to the B mode operation 4–20.

The hardware necessary to implement this interrupt feature is basically provided by two registers of the local thin-film memory housed within each Computer Module of the system. Referring briefly to FIGURE 13, there is shown a map of the local thin-film memory register locations. Included therein are two interrupt base address registers IARA and IARB, respectively listed as registers 063 and 067. Both registers contain the base address of the interrupt tables previously noted as being stored in the main Memory Modules 100 of FIG. 1. This base address information is used to determine the starting address of the interrupt servicing routine. The Control mode A interrupt table is not, and should not be, located in the same main Memory Module as the Control mode B interrupt table. This prevents both interrupt tables from being inaccessible when a single main Memory Module fails.

In the interrupt table of FIG. 5, there is shown the fourteen interrupt conditions used in the present system. Normally, the arrival of any one of these interrupt signals will cause the Computer Module receiving it to shift from the execution of an object program to the execution of a control program. The particular control program selected will depend upon the interrupt condition received, and there are in main memory appropriate control programs associated with each of the interrupt conditions.

Since it is known that the occurrence of certain conditions will require more immediate attention than others, the fourteen conditions have been given the predeterminded priority indicated by their numerical order. Thus, corresponding interrupt conditions are listed in the second column adjacent their respective position. As will be discussed in greater detail later, each of the Computer Modules in the system includes a twelve-bit interrupt register, one bit of which is correspondingly associated with a particular interrupt condition. This register is used to temporarily store, until serviced, the interrupt signals of the twelve lower order interrupt conditions. Similarly, each Computer Module also includes a register connected to the interrupt register and operated in conjunction therewith, to control the activation of certain bits of the interrupt register. This latter register is referred to herein as a mask register. Its main function is to prevent certain of the Computer Modules from responding to certain of the interrupt conditions. Thus, it provides the system with means of preventing all of the Computer Modules from simultaneously responding to a single control request.

The individual bits of the interrupt register are specified in the third column of the table in FIG. 5. It is important at this point to note that the two interrupt conditions having first and second priority designations do not have a location among the interrupt register bits of column 3. These two conditions are the only two of the fourteen interrupt conditions which may unconditionally affect all Computer Modules of the system without involving any bit of the 12-bit interrupt register contained in any Computer Module. They are, as indicated, in order of their priority, Primary Power Failure and Count Real Time Clock. As previously noted, each of the remaining twelve interrupt conditions operates in conjunction with one bit of a 12-bit interrupt register located in each Computer Module. Of the twelve bits listed, in the third column of FIGURE 5, four interrupt register bits can be masked from active operation. This prevents a particular Computer Module from responding to the selected masked interrupt. The bits of the 48-bit data word which loads the mask register correspond to bits of the interrupt register. These are listed in adjacent row locations in the column marked "Mask Bits" of the Load Special Register (LSR) operand. Thus, data word bits 1 to 20 are used with bit 3 of the interrupt register, while bits 21 to 36 relate to the bit 2, or the external request bit of the interrupt register. Bit 5 of the interrupt register can be masked by activation of bit 41 of the data word and bits 43 to 45 may be used to block activation of bit 9 of the interrupt register. The fourth column denotes which of the Computer Modules are affected by each of the interrupt conditions. Thus, the presence of the Primary Power Failure interrupt signal is responded to by all modules within the system, since all of them must prepare for the shutdown. However, in the case of a "Count Real Time Clock" interruption, while all Computer modules are affected by its presence, each responds individually to its demand. Only three of the fourteen conditions listed can be recognized while a Computer Module is operating in the interrupt mode A to thereupon cause the module to shift to operation in interrupt mode B. They are entitled: No Access to Memory, Parity Error and Illegal Instruction. However, the bits of the interrupt register may be set in any of the modes listed in the column entitled "Bit Set in Mode."

In the remaining two columns on the right side of the table, namely, "Response Control Mode" and "Response Normal Mode," there are listed the respective responses by a Computer Module operating in each of those modes with respect to each of the fourteen interrupts. It should be noted that the Computer Module will automatically store the information it is presently processing upon receipt of a "Primary Power Failure" interrupt signal regardless of its present operating mode. The response to a Count Real Time interrupt is also the same in both Normal and Control modes, since in either case the real time clock is incremented by one.

Figure 6:
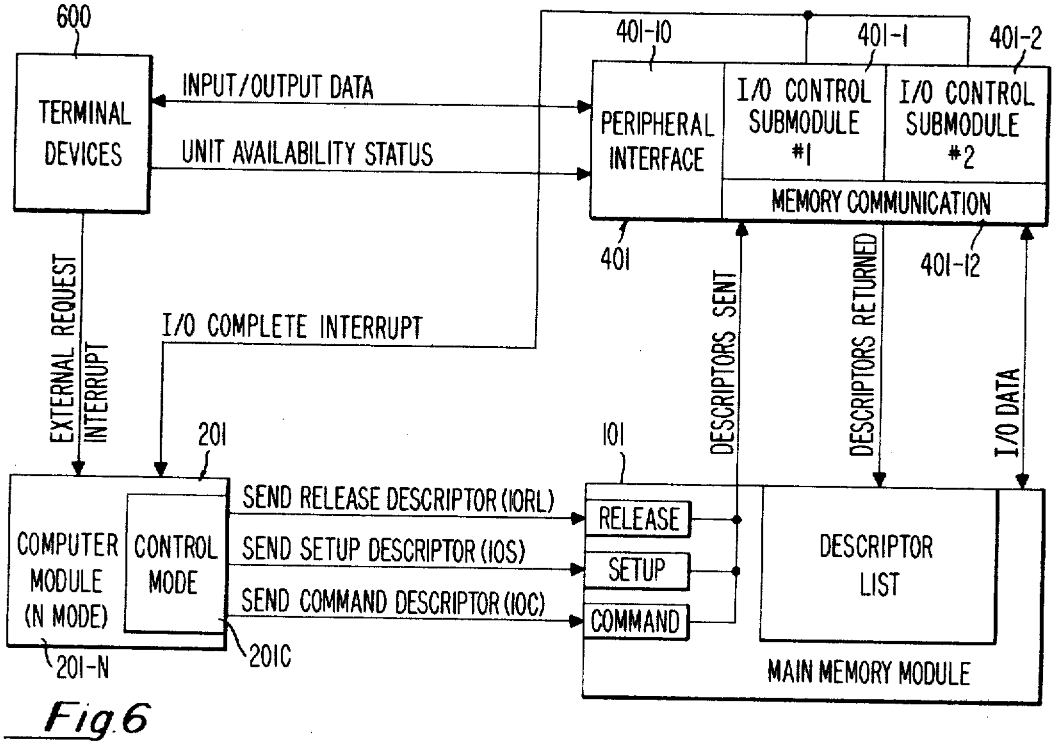
FIG. 6 is a basic block diagram illustrating the flowpath of an interrupt signal during an input/output operation.

FIG. 6 illustrates in block representation a system I/O operation utilizing appropriate interrupt signals to initiate and terminate the operation. For simplicity, a basic system is shown using only a single Memory Module 101, an Input/Output Control Module cabinet 401 with two I/O submodules or units 401–1 and 401–2 and a Computer Module 201. Also, a single block having the general designation Terminal devices 600 is included to pictorially represent a group of peripheral devices. The specific type of device used is not important to this discussion, so long as at least one of the aforementioned external request interrupt signals is generated.

Each of the two I/O control units 401–1 and 401–2 is, in effect, a small fixed program computer that receives, transmits, and reformats data in response to 48-bit word commands, called descriptors. There are basically four types of such descriptors each having its own distinct bit format and corresponding function. They are: the setup, the release, the command, and the result descriptors. The former three are housed in the main memory and are sent from there to one or more of the I/O Control Modules. The result descriptor content is created in the I/O Control Module and returned to a location in memory as determined within the Control Module.

The sequence in which these four descriptors are used is the same for every I/O operation. First, after receiving an I/O completion interrupt signal, the Computer Module 201 orders the Memory Module 101 containing the list of descriptors to send a release descriptor to the I/O unit 401–1 or 401–2 issuing the I/O completion interrupt signal. Next, a setup descriptor is ordered sent to all I/O units in a selected group. Thereafter, another release descriptor is sent to the selected I/O Control unit. A command descriptor is then sent to the selected unit, and finally, a result descriptor is sent from the unit to the Memory Module 101.

Referring this sequence more specifically to the figure, it is seen that the Computer module 201 is initially operative in its N mode, 201–N; however, upon receipt of the I/O completion interrupt signal from either I/O Control unit 401–1 or 401–2, the Computer module 201 shifts from operation in N mode, 201–N, to operation in its control mode, 201–C. In this mode the Computer module sends an IORL instruction to the thin-film Memory module 101 directing it to transmit a release descriptor stored therein to the I/O Control units 401–1 or 402–2 of the selected group which sent the completion interrupt. When this is done, the Computer Module 201–C next sends an instruction to the Memory Module 101 ordering it to send a setup descriptor to all units in the same selected I/O group. The release-setup-release cycle is not always necessary; following the completion interrupt another command may be sent to the I/O. However, if a command is to be sent without prior knowledge of a completion interrupt it is recommended that a release be sent prior to the sending of a command descriptor. Note: A setup descriptor is sent only when the program wishes to change the base address of descriptor list. This is followed by another instruction IORL to repeat the first step. Finally, the Computer Module 201–C instructs (IOC) the Memory Module 101 to transfer a command descriptor to the selected I/O Control unit 401–1 or 401–2. Included in this 48-bit word command descriptor is all of the program information necessary to execute the I/O operation. Thus, if the operation desired is an input operation, the unit acts to control and transfer the information data from the selected one of the input devices included in the terminal devices 600 to the Memory Module 101. Similarly, an output operation would be handled in the same manner, except, of course, the information data flow would be in an opposite direction through the peripheral interface 401–10 and the Memory communication means 401–12 of the I/O Control Module 401.

Figure 7:
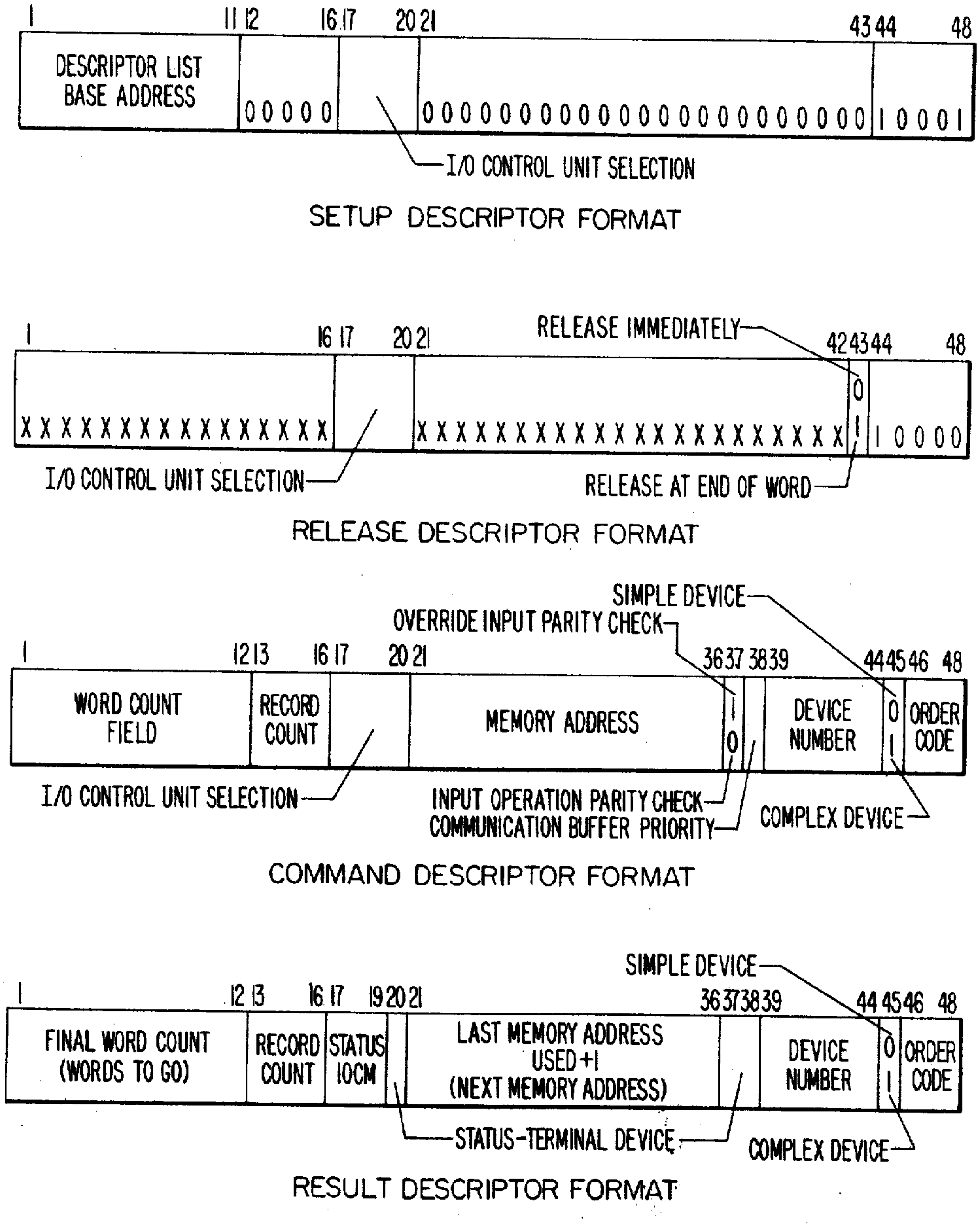
FIG. 7 illustrates the various descriptor word formats used by the I/O Control Modules to control the input/output operation of FIG. 6.

The bit format of each of the four descriptors used in conjunction with the I/O operation just described is shown in FIG. 7. The setup descriptor, shown at the top of the figure, contains in bits 17 to 20 the address of the selected I/O Control unit destined to receive the descriptor. The release and command descriptors also can be addressed to a specific I/O unit or to all ten units of a particular group by coding the same four bits, 17, 18 19 and 20, of the 48-bit descriptor word.

A 4-bit binary address corresponding to this number is then placed in bits 17 to 20. For example, if all four bits are ones, the descriptor is sent to all control modules or units of a particular I/O module group. For any other combination of bits the descriptor goes to a particular module. The memory address used by the I/O module for return transmission of a result descriptor is contained in the first eleven bits of the setup descriptor word and is noted as the descriptor base address. This address is stored in a single eleven-bit register in each I/O Control module and provides the base address of a 32-word list in the high-speed main memory known as the descriptor list. Both I/O modules or units in the cabinet use this address as a base from which to determine their particular memory address in the descriptor list. This determination is accomplished by adding to the base address one more than twice the unit number. Thus, the memory address of unit 5 is one more than 2×5 or 11.

All I/O units which successfully receive a setup descriptor will acknowledge such reception; however, those units which were not busy (idle) will become busy and return a result descriptor.

The format of the release descriptor is immediately below the setup descriptor in FIG. 7. This descriptor provides the system with the ability to change an I/O Control unit from the busy to a non-busy (idle) state. This change terminates the I/O's active operation. Bit 43 of the descriptor is used to inform the Control unit when it should terminate. If bit 43 is a binary 1, the I/O Control unit is notified to return when the last character of the memory word it is presently transferring has been completed. However, if bit 43 is a binary 0, the I/O Control unit is notified to respond immediately even if it means prematurely terminating a present transfer operation.

A release descriptor having correct parity is ignored by any nonbusy control unit. Further, a release descriptor is recognized by a busy unit only if the unit is specifically addressed by the descriptor or if the busy unit is included when the descriptor is generally sent to all units of a selected group.

The release descriptor as are all other descriptors, is indivdually checked for correct parity by all I/O Control modules of the selected group. If any one of the modules detects incorrect parity, the descriptor is treated as a command or setup descriptor having incorrect parity which has been addressed to all modules, in which case, if either one of the units in the I/O cabinet is nonbusy, the unit activates and causes a result descriptor to be returned to Memory. This descriptor contains status information indicating parity error. However, if both units in the identified cabinet are busy, the release descriptor is ignored and the busy units continue their present tasks.

The I/O Control unit which successfully receives a release descriptor will acknowledge the successful completion of the descriptor transmission by so signalling the computer which initiated the operation. However, this acknowledgment is not an interrupt signal, since an I/O completion interrupt will never occur when the I/O operation is ended by a release descriptor. In fact, the acknowledge and interrupt are different signals from the I/O module to the Computer.

All I/O Control units are set to the busy state when the system is turned on and remain busy until the first successful transmission of a release descriptor to that unit.

All operations of peripheral devices are initiated with a command descriptor. Its format is shown immediately below the release descriptor in FIGURE 7. This descriptor, also, may be sent to all units of a selected group or to a specific I/O unit. When it is sent to a specific units in the group, the addressed unit will accept it provided the descriptor has correct parity and provided the unit has completed a previous peripheral operation.

As in the case of a setup descriptor, the command descriptor is also addressed to all I/O units of the group if bits 17 to 20 are all binary 1, i.e., 1111. However, note that if the programmer elects to address all units of a group and more than one is idle, all such idle units will attempt to execute the command. Similarly, all nonbusy units will become busy and will return a result descriptor to memory if incorrect parity is detected in the command descriptor.

As indicated in FIGURE 7, the command descriptor is used to designate the type of peripheral device which is to be utilized. To simplify this designation, the types of peripheral devices used by the system are first classified as simple devices and complex devices. A simple device is defined as one which requires a single bus of the input/output exchange. There are two types of simple devices, namely a simple input and a simple output device. For this description, an input peripheral device is herein defined as a device which accepts information for transfer into the system, while an output device is defined as one which prepares information for transfer from the system. Thus, an example of the former is a card reader, and of the latter, a printer. A complex peripheral device is a bidirectional one which requires more than one bus of the I/O exchange. It can be considered as a pair of simple devices.

In the command descriptor shown in FIG. 7, it is noted that bit 45 is used to designate a complex device. Thus if bit 45 is set to a binary ONE, a complex device is required to execute the command whereas if a binary 0 is designated, a simple device is specified. Bits 39 to 44 of the descriptor word designate the selected peripheral device. Since there as six bits included in this group, the total number of selections possible is 64.

Two bits, 37 and 38, of the command descriptor are used to modify the operation of an I/O control unit in its execution of an input operation. For example, if bit 37 is a binary 1, the I/O control unit using this descriptor will not terminate on a parity error detected on the information transfer from the terminal device as it usually does. Rather, it will wait until completion of the transfer from the device before registering the error. If bit 38 is set, the I/O control channel in possession of this descriptor will not wait its turn in gaining access to the communications buffer of the I/O Control module cabinet, but will be given priority over its twin unit in the same I/O cabinet. If in turn that cabinet is on a memory bus which has priority within the Memory Module, it is accessing, the I/O unit will gain immediate access to its memory destination. A suggested use for this modification is in the case of one channel of an I/O Control Module communicating with a peripheral device having an operating speed of one megacycle and the other channel communicating with a peripheral device having an operating speed of 100 kilocycles. It would be desirable for the high speed device to have priority over the low speed device. It is, of course, realized that while either unit within a control module may be given priority, both units therein cannot simultaneously control operations which require this priority bit to be set.

The first twelve bits (1–12) of the command descriptor are called the word count field. This field specifies the number of words involved in the I/O operation. A maximum of 4096 words can be specified and thus transferred with one command descriptor. Bits 13 to 16 are referred to as the record count field. It contains the number of records, up to 16, involved in an input operation. For example, where a single record is designated, up to 4096 words, as indicated by the word count field, can be transferred. If the example involved multiple records, each record, with the possible exception of the first, would contain 256 words. The 16-bit field covering bits 21 to 36, specifies the initial memory address to be used by the I/O control unit and is correspondingly referenced in the figure.

Three bits of the command descriptor provide the order codes which are sent to the I/O control units for transmission to the peripheral devices. They are bits 46, 47 and 48. In the case of a simple input device, two of the eight possible order codes are reserved to designate release and setup descriptors and only three of the remaining six order codes are used. They are: 010, 011, and 100. The other three codes (101, 110 and 111) even if sent, will be interpreted by the device exactly as though they were code 010.

These three order code bits (46–48) are also used for providing various instructions to the simple output devices as well as to any complex device. However, in both of these cases the four additional bits of the record count field, namely bits 13, 14, 15 and 16, are also available. Bit 46 is used by the I/O Control Module to notify a complex device performing an output operation that the last character in the communication is being sent and the eight least significant bits of the 12-bit word count field are zero.

The format of the result descriptor is shown at the bottom of FIGURE 7. It is the only one of the four descriptors shown whose direction of travel is from the I/O control unit to the memory. Consequently, its main function is to provide the system with information regarding the status of an I/O operation.

Its first twelve bits indicate the number of words remaining to be transferred. Similarly, the next four bits (13–16) note the number of records remaining to be read. There are six bits in this descriptor which specifically provide the system with information about the condition or status of an I/O operation. Three of these bits are assigned to the I/O Control Module and three to the peripheral device. Bits 17 to 19 convey status information related to the I/O Control Module. The following eight codes may be communicated by these three bits to the system regarding certain status conditions of the I/O Control Module. They are:

| Bits 17 | 18 | 19 | |
|---|---|---|---|
| 0 | 0 | 0 | A setup descriptor has been correctly received by a non-busy I/O unit. |
| 0 | 0 | 1 | The peripheral device specified by the command descriptor is not available. |
| 0 | 1 | 0 | The peripheral device operation in progress has been prematurely terminated by a release descriptor transmitted under program control to this I/O control unit. |
| 0 | 1 | 1 | The word count field as defined by bits 1-12 in the command descriptor is at zero, indicating that the specified data transfer has taken place. |
| 1 | 0 | 0 | The request to memory has exceeded a time limit of 3.75 μsec. (five memory cycles). |
| 1 | 0 | 1 | An A-C power failure has occurred. |
| 1 | 1 | 0 | A character transmitted to the I/O unit from an input device has been received with even parity and bit 37 (parity override) was not set in the command descriptor. |
| 1 | 1 | 1 | On an output operation or a descriptor transmission, a parity error was detected on the word from memory. For an input operation, the word count field has gone to zero, bit 37 (parity override) was set in the command descriptor, and the I/O unit detected a parity error in at least one input character received from the peripheral device. |

The remaining three bits 20, 37, and 38 are assigned to provide status information relating to the peripheral devices. The field formed by these three bits and the field formed by the former three status bits are mutually exclusive. However, if both are simultaneously present in the returning descriptor, the system gives priority to the status information relating to the peripheral device. Since there are a number of different peripheral devices, status information must relate to the particular device being utilized. Thus, a general set of status codes will not be set forth as was done with bits 17, 18 and 19. However, to illustrate a specific case, the following status patterns may be returned from an I/O control unit which is controlling a card punch peripheral device.

| Bits 20 | 37 | 38 | |
|---|---|---|---|
| 0 | 1 | 0 | No response to status control. |
| 0 | 1 | 1 | Unit malfunction. |
| 1 | 0 | 0 | Illegal instruction. |
| 1 | 0 | 1 | Punch error. |
| 1 | 1 | 0 | Data too slow. |
| 1 | 1 | 1 | Parity error. |

The 16-bit address specified by bits 21 to 36 of the result descriptor indicates its destination upon return to the main memory. This address is always one greater than the address of the last memory word transferred from memory.

Bits 39 to 44 of the result descriptor provide the identifying number of the peripheral device which has performed the operation, while bits 45–48 are almost invariably merely copies of the corresponding bits of the command descriptor. There is, however, one exception, where the terminal unit used is a simple input device. In this instance, the result descriptor returned may include different bits to denote how the operation was initiated.

Figure 8:
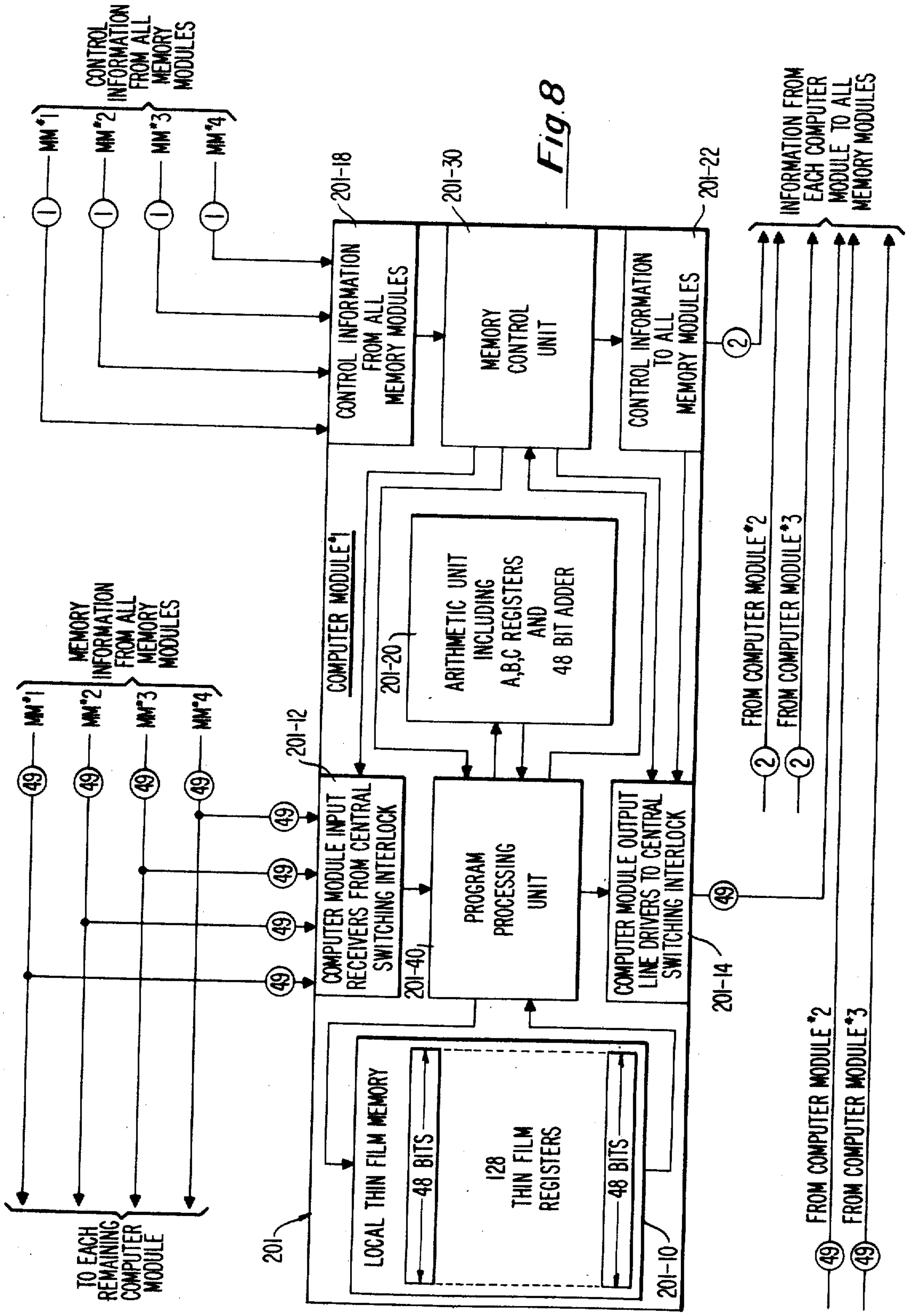
FIG. 8 is an external wiring diagram of a Computer Module in the proposed system.
Figure 9:
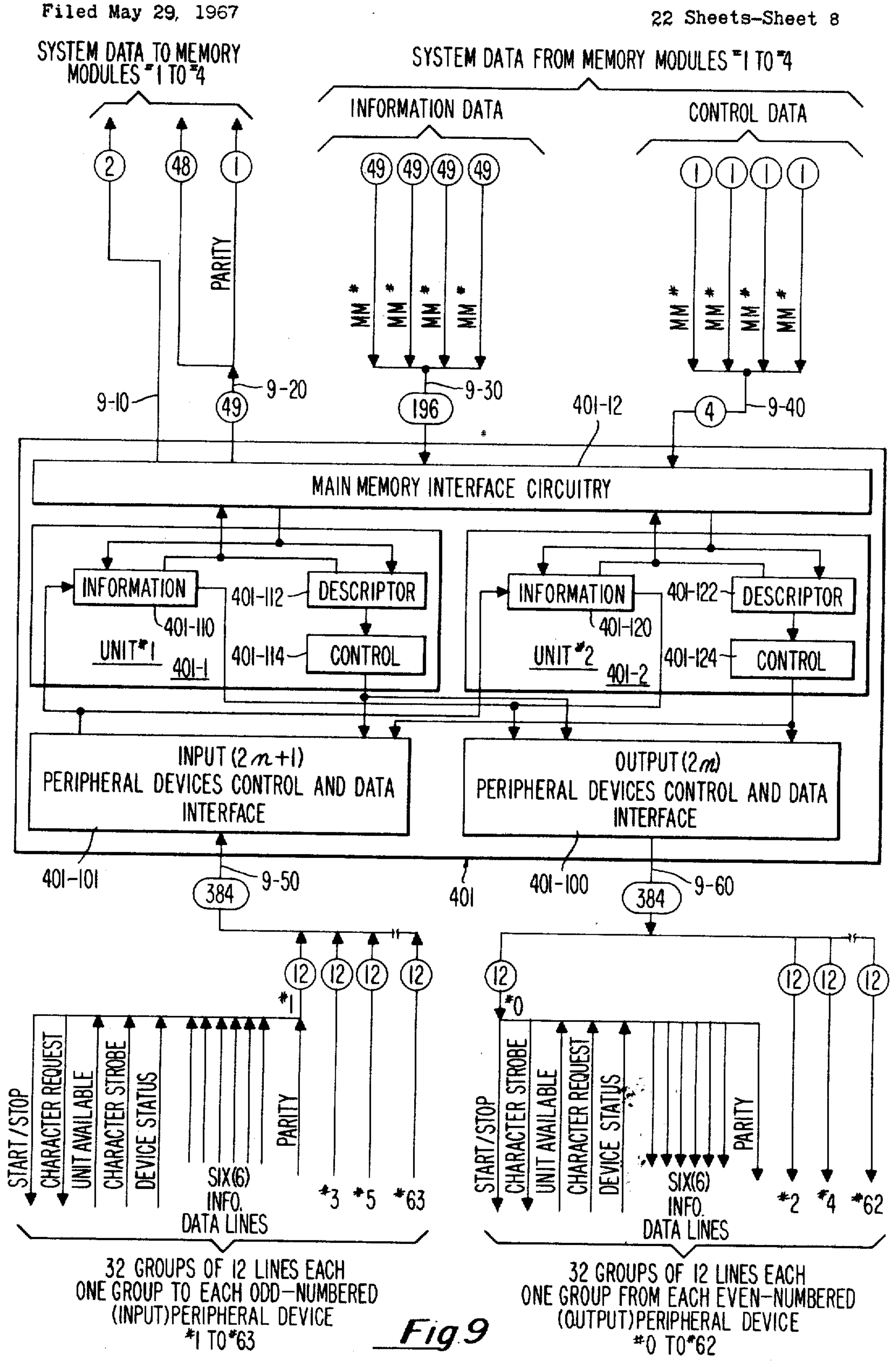
FIG. 9 is an external wiring diagram of an Input/Output Control Module in the proposed system.
Figure 10:
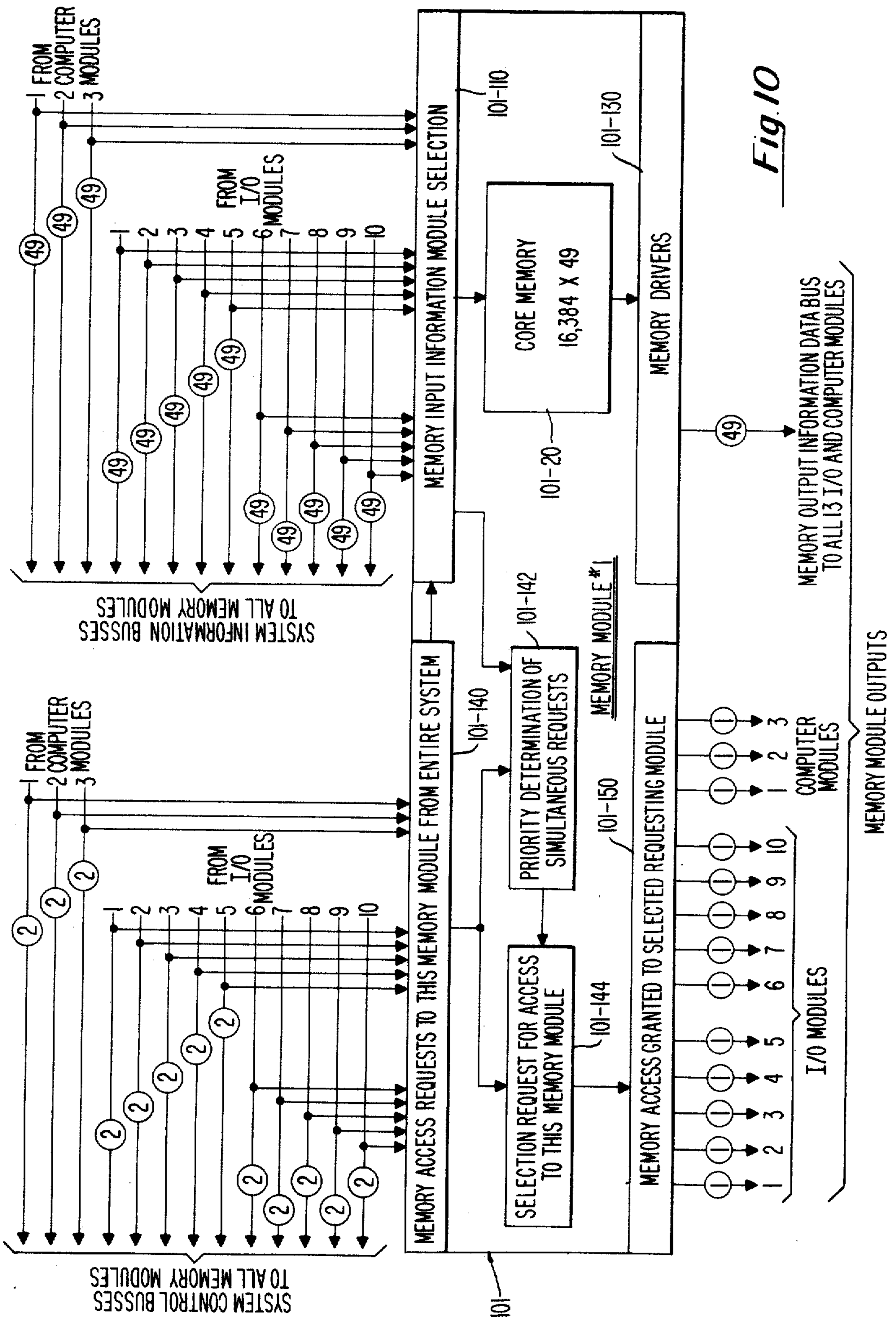
FIG. 10 is an external wiring diagram of a Memory Module in the proposed system.

FIGURES 8, 9 and 10 illustrate the external wiring diagrams of the Computer, the I/O Control and the Memory Modules, respectively. In each case, a simplified block diagram of the internal portion of the module is shown to enable a tracing of the signal flow through the module. The Computer Module 201 shown in FIG. 8 illustrates the four major portions of each one of such modules. They are the program processing unit 201–40, the arithmetic unit 201–20, the memory control unit 201–30 and the local thin-film memory 201–10. The memory control unit 201–30 directs control information to all memory modules 201–22, requesting memory information at a particular location to be read out of the memory. It also specifies where this information is to be sent. The control unit 201–30 performs this operation under orders from the program processing unit 201–40 which is executing the steps of a particular program. In general, this processing unit 201–40 is the control unit of the Computer Module 201. This becomes immediately apparent when it is considered that it is the only unit which is bidirectionally coupled to all of the remaining three major portions. Thus, it not only can transfer information to the thin-film memory unit 201–10, the arithmetic unit 201–20 and the memory control unit 201–30, but it can order these units to transfer information to it as well.

Information and control data enter the Computer Module through the connections shown at the top of FIG. 8. While such data leaving the module do so via the bottom connections. Input and output connections are shown to include cables from and to all other modules in the data processing system. Memory information enters the Computer Module through a 49-line cable which is selected from among a group of cables which includes a cable from each Memory Module. Likewise, control data enters through one of a group of lines which includes a control connection from each Memory Module.

Memory information leaves the Computer Module shown in FIG. 8 in a single 49-line cable which is commonly connected to all Memory Modules in the system. Similarly, control information is sent from the module in a single 2-line cable which is commonly connected to all memory modules. The internal operation of this Computer Module will be considered and described later in this specification.

FIG. 9 is also an external wiring diagram; however, it illustrates the wiring of an Input/Output Control Module. All such modules have the same connections and consequently only one will be described. The wiring connections of the control module are unique among the system modules herein described in that they include, in addition to input and output connections to all of the memory modules, input and output connections to all of the peripheral devices of the system. Its connections with all of the Memory Modules are shown at the top of FIG. 9, while the peripheral device connections are shown at the bottom. It should be reiterated that the I/O Control Module 401 shown in FIG. 9 includes two identical I/O control units 401–1 and 401–2. These units share common interface circuitry 401–12, 401–100, 401–101 to both the main memory and the peripheral devices. The main memory interface circuity 401–12 receives information data from the main memory through a group of 49 line cables 9–30 and a group of control lines 9–40. In this respect, the module is like the Computer Module shown in FIG. 8. The information return cable 9–20 to memory is similar in that it also comprises 49 lines as is the control cable 9–10 with its two return lines.

Referring to the bottom of FIG. 9, it is seen that the interface between an I/O Control Module and the plurality of peripheral devices includes the control and data lines necessary to establish and maintain communication between any one of the peripheral devices and either one of the I/O units. Thus, the input interface circuitry 401–101 receives a multicable connection 9–50 comprised of 32 input cables each having 12 lines. Each input cable is capable of enabling a simple input device to communicate with an I/O unit. The output interface circuitry 401–100 is connected to a similar plurality of cables 9–60 to provide corresponding capability for each simple output device. Each of the output cables also has 12 lines. There are 5 control and 7 information lines in each cable. Six of the information lines provide a character of information at one time and the seventh line provides a parity signal. All input as well as all output cables may be utilized by either of the I/O units, 401–1 and 401–2, included in the module. Five control lines are contained in each and every cable included in the multicable connections 9–50 and 9–60. They are: a Start/Stop line, a Character Request line, a Unit Available line, a Character Strobe line, and a Device Status line. A complex device requires two cables, one for input and another for output. The input cable number is always one greater than the output cable number.

In the Memory Module 101 illustrated with its external wiring diagram in FIG. 10, a memory 101–20 is shown connected between an input information selection means 101–110 and the output information drivers 101–130. Entering the selection means are thirteen 49 line cables, one of which is coupled from each of the three Computer and each of the ten I/O Control Modules in the system. Also entering the Memory Module is a control cable from each of these other thirteen modules. As previously noted, these control cables are identical from all Computer Modules and I/O Control Modules.

These cables provide the necessary control information to request access to a particular Memory Module. Accompanying each request are an additional 19 control lines which are present on the most significant 3 bits and the least significant 16 bits of the 49 line information cable. The most significant 3 bits specify the operation code to memory. These codes are different depending on whether they originate from an I/O Module or a Computer Module. Both modules may send either a rear or a write operation code. In addition to these two codes, the Computer Module may send a command for a descriptor to be sent to particular groups of I/O Control Modules. The least significant 16 bits of the 49 line information cable contain the Memory Module address and word address within the module. Since each of the Memory Modules contain 16,384 addresses, 14 of these lines will specify the word address. The remaining two bits are used to specify the Memory Module address. An individual Memory Module can only satisfy one request at any given instant, thereby making a priority resolution necessary in each Memory Module. This resolution is provided for by the priority determination circuitry 101–142. If no conflict exists, the access request is granted 101–150 and the requesting module is so notified by one of the output control lines emanating from the lower portion of the figure. The selected word is thereafter transferred from the memory 101–120 and transmitted to the requesting module by the memory output drivers 101–130 in a single simultaneous 49-bit transfer.

Figure 11:
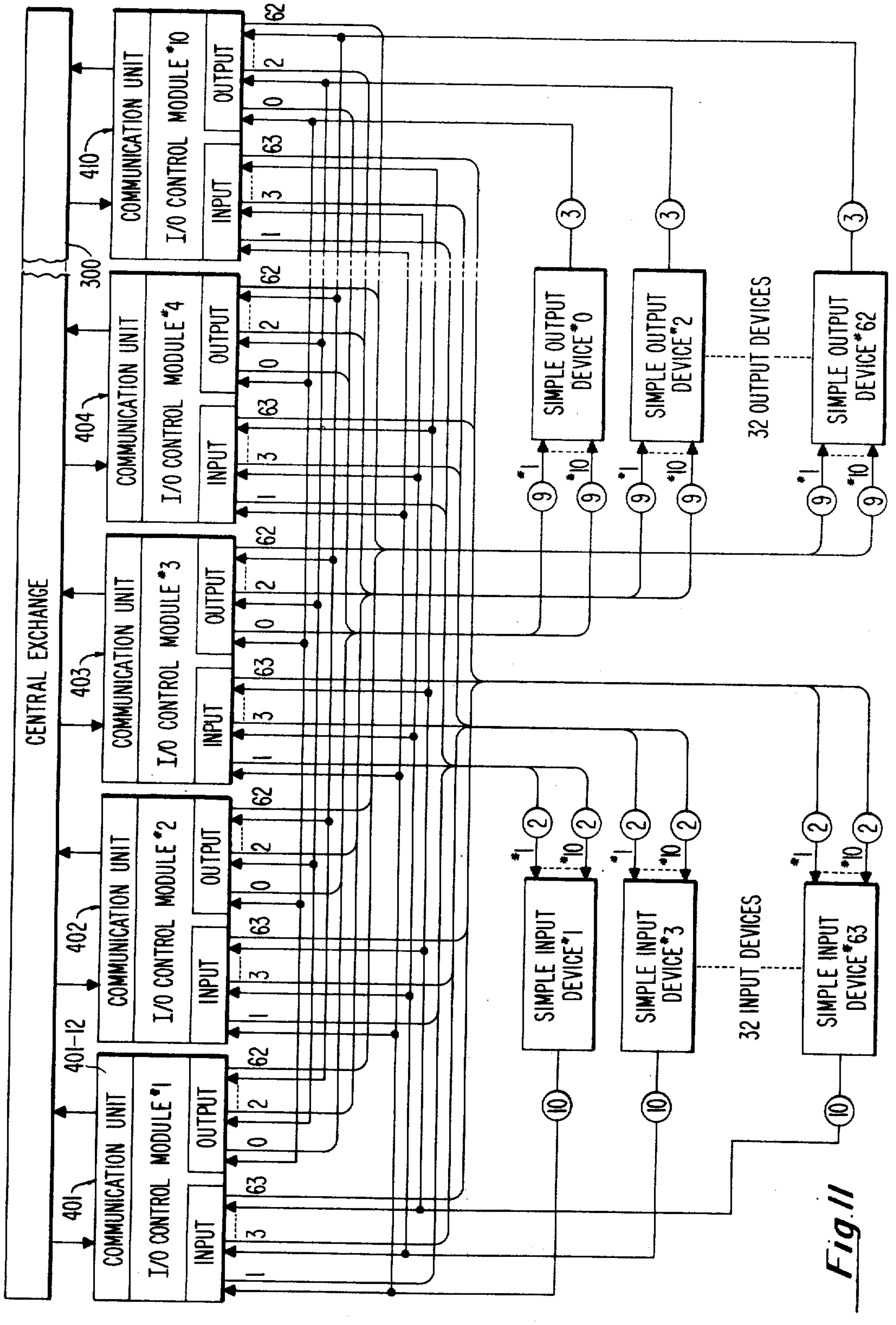
FIG. 11 is a wiring diagram of the input/output switching exchange showing the interconnections between the I/O Control Module cabinets and the peripheral devices.

FIG. 11 illustrates the interconnection between the I/O control modules and the plurality of 64 peripheral devices. This interconnection is more generally illustrated in FIG. 2 where it is referred to as 500 and as the input/output exchange in FIG. 1. Similarly, the central exchange 300 shown was also previously referred to and identified in those same figures. From each of the ten I/O control modules 401–410 there are identical cable groupings coupled to each of the 64 peripheral devices 600.

Each group of sixty-four is divided into 32 input and 32 output cables. To simplify the illustration, the figure includes only a representative number of these cables and their corresponding devices. It is seen, however, that each input cable connected to each of the ten I/O Control Modules includes a total of 12 lines. Ten of these lines carry information from the device to the module and consequently, relative to the module, are considered input signal lines. However, the remaining two lines of the input cable transfer information in an opposite direction and are used by the module for such purposes as starting or stopping the device, or requesting information from an input peripheral device. Similarly, each of the output cables connected to each of the output portions of the ten I/O control modules includes 12 lines. However, these lines are divided somewhat differently. Nine lines of each of the 32 output cables carry information from the I/O Control Module to the peripheral devices, while the remaining three lines of each cable are used to transfer information in the opposite direction, i.e., from the device to the I/O Control Module.

It is believed apparent from consideration of FIGURE 11 that an I/O exchange or network is created when 32 input and output cables such as those just described are connected from each of ten I/O Control Modules to a group of 32 input and 32 output peripheral devices. The creation of such a network not only enables any one of the I/O Control Modules to communicate with any one of the available peripheral devices but also enables a number of such communications to be performed simultaneously.

FIG. 12 is a block diagram of a Computer Module 201 showing its functional areas. Three such Computer Modules can be used in a maximum system. Further, a fourth Computer Module may be used in place of the tenth I/O Control Module. Computer Modules are housed in individual cabinets and basically have three functional areas: logic and control, arithmetic and storage. The logic and control area is used for instruction execution; indexing, relative and indirect addressing; and interrupt processing. The arithmetic area performs arithmetic operations, shifting and comparisons. The storage area provides a local thin-film memory which is readily available and rapidly accessible.

Figure 14:
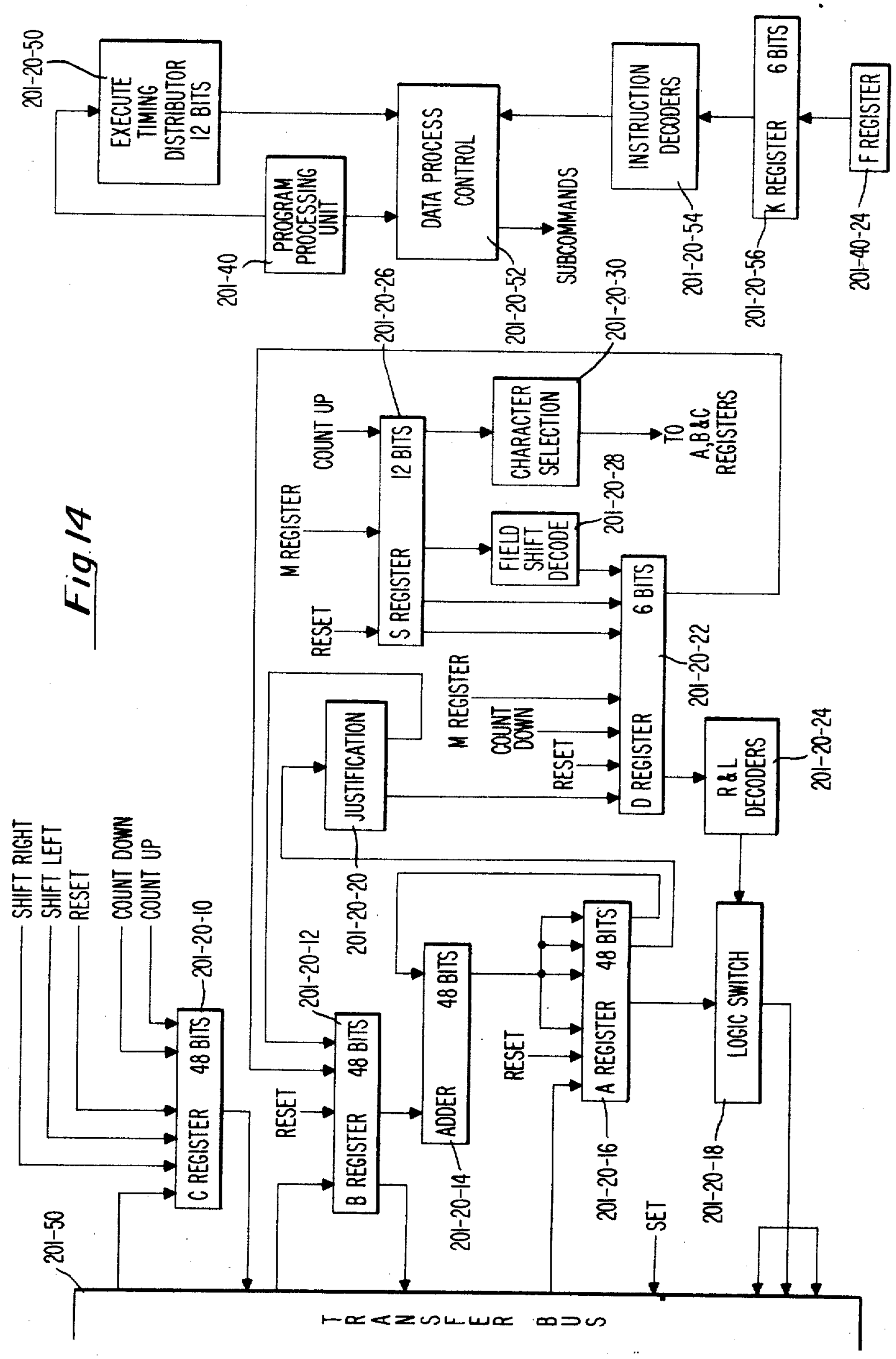
FIG. 14 is a detailed block diagram of the arithmetic area of a Computer Module of FIG. 11.
Figure 15:
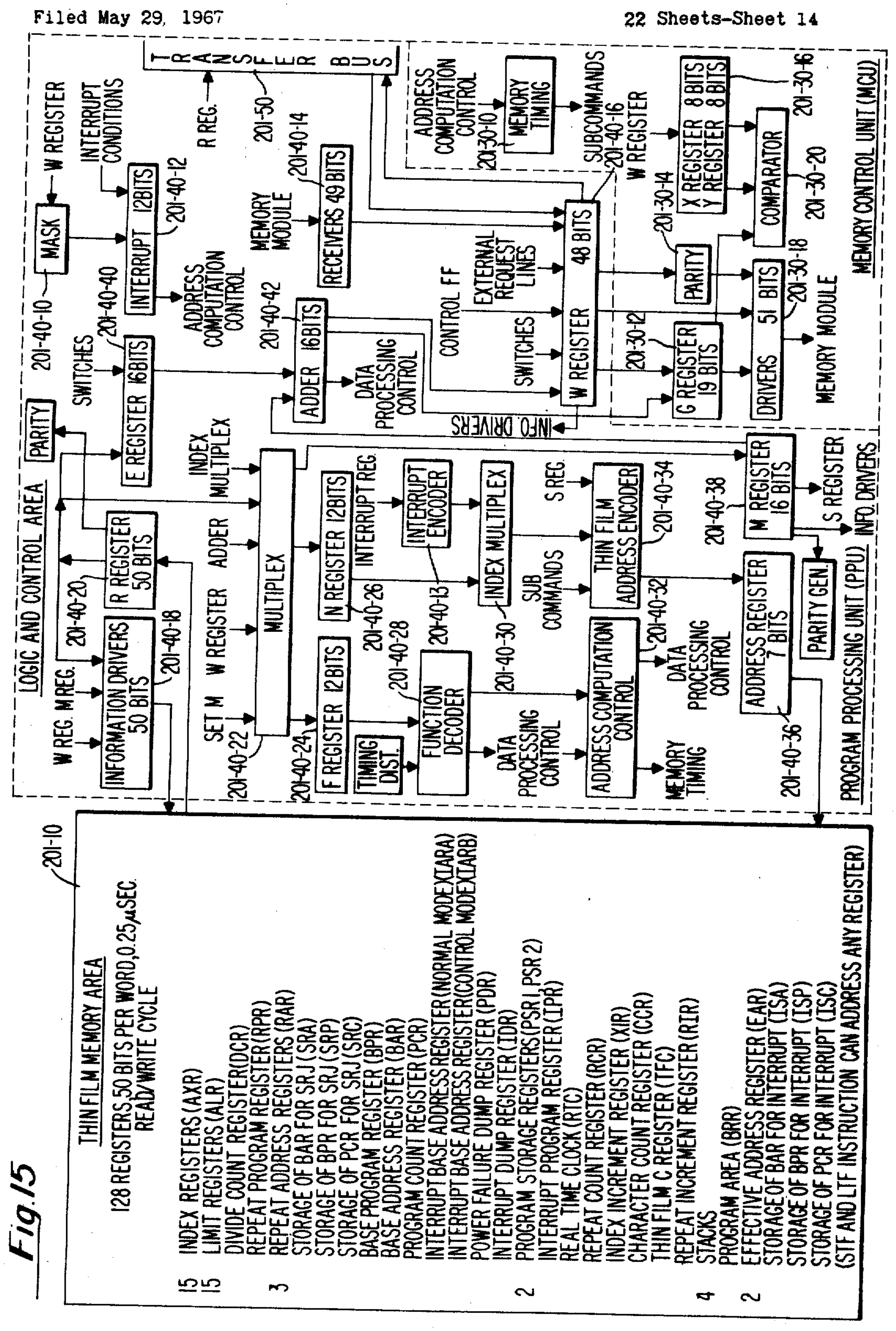
FIG. 15 is a detailed block diagram of the logic/control area, including the program processing and memory control units. The thin film memory area is repeated for clarification.

FIGS. 13, 14 and 15 refer individually to these same three functional areas of the Computer Module shown in FIG. 12. Thus, a separate figure is devoted to each of the areas to provide a more detailed disclosure. FIGURE 13 includes FIGURES 13A and 13B, which together illustrate a complete map of the thin-film memory unit 201–10, while FIGS. 14 and 15 provide separate block diagrams of the arithmetic area and the control area, respectively.

Basically, the Computer Module operates as a variable 3-address machine whose program instructions are treated as strings of syllables. A program word consists of four 12-bit syllables plus a parity bit. There are four different possible types of syllables in a program word: operator, variant, address and index. The operator syllable consists of a 6 bit command code and three 2 bit address indicators. The command code specifies which instruction, out of a possible 61, that the computer will execute. The address indicators specify how many syllables are needed to complete the instruction. Instructions may range from one to seven syllables in length. The variant syllable consists of a 12 bit instruction modifier. An address syllable consists of 11 bits of literal address and one bit for an indirect address indicator. Index syllables are comprised of three fields of four bits each. The address and index syllables can be combined to effect both direct and indirect addressing. An infinite number of levels of indirect addressing are possible with indexing at the last level.

As seen in FIGURE 12, the logic and control area contains a program processing unit (PPU) 201–40 and a memory control unit (MCU) 201–30. Thus, the circuitry of this area is used to perform indexing, indirect addressing, address computation and other logic operations. The program processing unit (PPU) 201–40 is the central control system of the Computer Module. All data and program words are handled in this unit prior to routing through the switching interlock 300 to the main memory or arithmetic unit 201–20. The program processing unit sets up data and instructions. It reads the program from the local thin film memory 201–10, a syllable at a time, computes the data fetch address, performs indexing, and starts the arithmetic unit 201–20 or the memory control unit 201–30 (MCU). It then processes the next syllable while the other units perform their functions. This ability to simultaneously process successive program syllables is a special feature of the machine known as "program overlap," which is described in detail later in this specification. Briefly, however, it is accomplished during the operation of the arithmetic unit 201–20 (or memory control unit 201–30), at which time the PPU fetches the next program word, calculates the store or branch address, and commences to set up the next instruction for the arithmetic unit. As a result, time charged for program fetch is considered negligible.

The PPU 201–40 contains the mask register and memory bounds register used with the load special register (LSR) instruction previously described in reference to the interrupt system. Otherwise, it is not program accessible.

The PPU services all program interrupts by storing all pertinent control information in thin-film registers of the thin-film memory 201–10 upon receipt of an interrupt condition signal. This information is required to restore the program to the point of interrupt at a later time. It then branches control to an interrupt program and selectively resets the interrupt register.

The memory control unit (MCU) 201–30 is used by program processing unit (PPU). When set up with an address by the PPU, the memory control unit 201–30 establishes control and waits for access to main memory. Upon gaining access it places the resultant data into the W register of the PPU. The PPU will then place the data in the arithmetic unit for processing (or the program storage register (PSR) in the local thin-film memory 201–10, in case of a program branch or overlap.

In case of a main memory store operation, the memory control unit 201–30 checks the address received to determine if it is within preset bounds. It then waits for the resultant data word from the arithmetic unit prior to accessing main memory and transmitting the data. If, for any reason, access to a Memory module is requested but not granted after ten milliseconds, an interrupt condition is created and the instruction is terminated. The bounds registers, X and Y are the only parts of the MCU that are program accessible.

The arithmetic area of the Computer Module shown in FIGURE 12 comprises an arithmetic unit 201–20. This unit includes the three working arithmetic registers A, B, and C and their associated controls. The A and B registers perform the actual arithmetic computations. All three registers are used as shift registers for fixed and floating-point operation. The arithmetic unit registers are not program-accessible.

The thin-film memory area of the Computer Module has a magnetic thin-film memory unit 201–10. This local thin-film memory unit is comprised of one hundred and twenty-eight (128) thin-film, 50-bit registers. As shown, it operates in conjunction with the program processing unit 201–40 to provide a high-speed storage means which substantially reduces the number of data accesses to the main memory modules.

As previously noted, FIGURES 13, 14 and 15 refer in much greater detail to each of the functional areas of the Computer Module. These figures will now be individually described. Referring next to FIGURE 13, it is seen that all of the 128 thin-film registers can be addressed by an octal code number (057 for example). They may also be specified by a name (index register 10) or by a group of capital letters which are known as a thin-film address identifier (for example, PCR also identifies thin-film register address 057). The thin-film map thus identifies the thin-film registers and register groups by number as well as by name. The functions of these registers are described in the following paragraphs.

Five operand registers are contained in the thin-film area: the four operand stack registers having octal code numbers 140, 144, 150 and 154, and the Thni-Film C (TFC) register at 124. The TFC register holds the least significant data portion for a Double length divide (DDV) instruction, Floating Divide (FDV) instruction and double length shift (SHF) instruction. It also stores the least-significant half of a double-length product of a multiplication operation and the remainder of a division operation and the result of the double length shift instruction.

The two Program Storage Registers (PSR1 and PSR2), having octal numbers 100 and 104, provide storage for eight instruction syllables and permit overlapped instruction fetch during long instructions.

The Base Address Register (BAR) at 055 contains the base address of the data address area. The Base Program Register (BPR) at 054 contains the base address of the branch program address area. The Program Count Register (PCR) at 057 holds the address of the last word (most recently fetched from memory) in the program storage registers.

Fifteen index registers and 15 comparison limit registers are located at the first 30 octal code numbers (000 through 037) in the local memory in each index address syllable and may be used to modify each operand address. Index registers may be incremented, decremented, and compared in six different ways with limit registers. The index increment register (XIR) is used by the logic during the execution of the index increment instruction. Index register 0 and limit register 0 are special registers used with compare operations. Both always contain zero. Information can be stored in limit register 0, but it always contains zero when compare operations are performed. Information can otherwise be stored in limit register 0, at octal location 020, but never in index register 0 at location 000.

The 24-bit contents of the Real-Time Clock (RTC) register at location 114 is automatically read out and incremented once every 10 milliseconds. The real-time clock may be sampled and set by the program. An interrupt is initiated when the count overflows if the mask bit is set.

The character Count Register (CCR) at location 123 is used by the character search (CSE) instruction to indicate the character position last examined for the specified character.

When a repeat instruction is used, the Repeat Program Register at location 041 (RPR) provides storage for the four syllables of the program word being repeated; the Repeat Count Register (RCR) at location 120 contains the number of iterations yet to be performed while the Repeat Increment Register (RIR) at location 130 contains the increments corresponding to the addresses contained in three repeat address registers (RAR) at locations 144, 145 and 146 of the repeat instruction.

The subroutine base address register (SAR) at location 060 contains the base address of a list of subroutine addresses. When a subroutine is executed, the subroutine storage registers (SSR)(SSA, SSP, SSC) holds subroutine information, i.e., the former contents of the BAR, BPR and PCR. The interrupt program register (IPR) at location 110 provides storage for the contents of the last addressed PSR, during interrupt, while the interrupt dump register (IDR) at location 070 holds the PSR and repeat controls for interrupt return. The power failure dump register (PDR) at location 064 holds the contents of the control flip-flops and of the flip-flops of the interrupt register in the event of a power failure.

The program area from which the last branch was made is contained in a register (BRR). The effective address registers EAR1 and EAR2 keep track of all memory addressing (except in repeat mode) until a memory communication error is made. They remain unchanged until this error condition is serviced.

The interrupt system, as previously described, handles interrupts arising from such conditions as arithmetic overflow, overflow of the real-time clock, illegal instruction, parity errors, external input-output requests, and input-output result situations. Further, as noted, each Computer Module has an interrupt register which can be set through the interrupt mask register. Thus, when a particular condition has caused a binary ONE to be at some bit position in the interrupt register, a program interrupt occurs. This interrupt, of course, stops the program being executed, stores sufficient information in these thin-film registers to allow continuation of the interrupted program at a later time, and transfers control to a unique program to service the interrupt. If an error occurs while operating in the control mode, control is transferred to another unique program to service the error. Return through the interrupt return (IRR) instruction, is always to the initial normal mode. The unused thin-film registers included on the FIGURE 13 map of this local memory are reserved for use by the Executive Control Program.

FIGURE 14, as previously noted, particularly relates to the arithmetic area shown in FIGURE 12 and provides a detailed block diagram of the arithmetic unit 201–20 included therein. For purposes of continuity, a portion of the transfer bus 201–50 of FIGURE 12 is shown at the left of FIGURE 14. As was mentioned before, the arithmetic unit basically includes the three working arithmetic registers of the Computer Module together with their associated controls. They are the A register 201–20–16, the B register 201–20–12 and the C register 201–20–10. The A and B registers 201–20–16 and 201–20–12 perform the actual arithmetic operations and all three are used as shift registers for fixed and floating point operations.

The adder 201–20–14 included in this arithmetic unit is capable of adding two 48-*bit* numbers in a single clock time. Since the present system operates at a clock speed of four megacycles, a full sum is obtained in 250 nanoseconds. This sum is then placed in the A register 201–20–16 and positioned according to the nature of the instruction. A full 48-bit shift is also performed in one clock time, as is a 48-bit transfer from one register to another. This results in greatly reduced execution time for repetitive instructions such as multiply and divide.

A feature of this arithmetic unit is its ability to position the word in the A register. This positioning of the word is accomplished by shifting the result to the left or right as it is transferred into logic switch 201–20–18. The logic switch is comprised of a plurality of switching positions which may be varied to satisfy any magnitude of information to be switched, thereby enabling it to switch any amount of logical information desired in a single clock time. Register D 201–20–22 in turn, applies the necessary shifting information to R and L decoders 201–20–24 which decodes the shifting information and correspondingly causes the information contained in the logic switch 201–20–18 to be appropriately oriented.

Contained in the S register, 201–20–26, is the variant syllable which accompanies the shift instruction, and controls what type of shift: right or left; end-off or end-around; arithmetic or logical; single or double, will be executed. A single shift is performed on one 48-bit word. The double shift is performed on two 48-bit words, the least significant portion of which is contained in the TFC register in local thin film.

Shifting is also used in instructions which need to be normalized. A non-normalized result of an arithmetic instruction is the instruction CBF (convert Binary to Floating point). These instructions cause the 48 bit word to be shifted to the left and the exponent to be adjusted. This process is known as justification, 201–20–20, and continues until there is a binary one on the most significant position of the mantissa.

The character selection means 201–20–30 and the field shift decode means 201–20–28 each respond to signals from the S register 201–20–26. The character selection means, in turn, has its output applied to the A, B and C registers to enable it to selectively indicate one of the characters contained in each of these working registers.

The field shift decoding means applies its output to the D register 201–20–22 to cause a shifting operation similar to the above positioning operation except that the shifting to be accomplished is to affect a field of information rather than a particular bit. The field may be any multiple of 6 up to a maximum of 48 bits.

In the right-hand portion of FIG. 14, the timing distributor 201–20–50 associated with the arithmetic unit is shown together with a generalized block diagram showing the path of the timing control signals used in this operation. Thus, the program processing unit 201–40 is shown activating the timing distributor and simultaneously notifying the data process control means 201–20–52 of this initiation. This control means, in turn, causes the issuance of one of a group of subcommands. The F register 201–40–24 shown in FIG. 15 in the PPU portion of the drawing is also illustrated activating the 6-bit K register 201–20–56 to, in turn, cause the instruction decoders 201–20–54 to signal the data process control means 201–20–52 of the instruction to be executed during this time sequence.

FIG. 15 illustrates a detailed block diagram of the logic and control area of the Computer Module. As previously noted, this area includes the program processing (PPU) and the memory control unit (MCU).

The thin-film memory area 201–10 is also shown to indicate its relationship with the PPU of the module. Since the program processing unit is the central control system of the Computer Module, it is utilized to read the program, start the arithmetic and the memory control units. It is also used to address and activate the thin-film memory portion of the module. Thus, the 50-bit information drivers 201–40–18 in the PPU are activated by the contents of the 48-bit W register or the 16 bit M register to drive the 48 information lines of the local thin-film memory during a write operation. The remaining two bits are driven by the parity generator from the W register or the M register. The 48 bit word is taken as two separate 24 bit registers for the parity generation. The first 24 bits which always comes from the W register or the W and M register, has another parity bit associated with it. Both bits are generated to make overall parity odd.

Alternately, the 50-bit R register 201–40–20 receives the 50-bit output of the local memory when a reading operation is performed. During a read operation the 50 bit R register is checked to assure that overall parity is odd. If an error is detected, i.e., parity even from either half, the master clock in computer is stopped and processing is stopped. The address of the thin-film and the contents of that register are displayed. It should also be noted that the output of the R register is returned to the information drivers to accomplish the regenerative re-write operation necessary to this type memory. A multiplex means 201–40–22 operates to provide a simultaneous transmitting path for several functions. Thus, it receives the output of the R register, as well as the W register, the adder 201–40–42 and the index multiplexing means 201–40–30 to accomplish the necessary indexing of control information and its necessary attendant variations in control instructions. The output of the multiplex means 201–40–22 is connected to a number of registers, which perform the necessary decoding and encoding operations to the multiple functions included in the singular contents of the multiplex means. Thus, the F register 201–40–24 is a 12-bit register which receives the functional information contained in the multiplex means. This information is, in turn, decoded 201–40–28, to identify the function, and coupled to the necessary controls included for data processing and its attendant address computation control 201–40–32. The N register 201–40–26 is another 12-bit register connected to receive the output of the multiplex means. However, it provides information which must be encoded.

The interrupt register 201–40–12 and its mask register 201–40–10 also operate to provide information which must be encoded. Thus, the interrupt encoder 201–40–13 supplies such information to be properly indexed 201–40–30 for multiplexing prior to its being coupled to the thin-film address encoder 201–40–34 for the creation of an address in the local thin-film memory. This address is then placed in the address register 201–40–36 for subsequent addressing of the location in the thin-film memory which is to be activated.

The 16-bit M register 201–40–38 is also connected to the multiplex means to receive information which requires mathematical manipulation. Thus it receives information which is to be sent to the adder 201–40–42 where it is combined with the contents from the E register 201–40–40. It also receives information from the multiplex means which is to be sent to the S register of the arithmetic unit to provide the information for any shifting function which is to be performed.

Input control information to the Computer Module enters the 48-bit W register 201–40–16 as does input data from the Memory Module. The memory data, however, initially enters a plurality of receivers 201–40–14 which have the capacity to handle 49 bits of such data.

Similarly, data which is to undergo or has undergone mathematical manipulation in the arithmetic unit passes through the W register by way of the internal transfer bus 201–50 of the Computer Module.

The Memory control unit (MCU) handles control and transfer assignments given it by the program processing unit. This unit 201–30 is enclosed in the lower right-hand portion of FIGURE 15 by a dashed line. It contains and controls the 51-bit line drivers 201–30–18 which transmit address and data to the Memory modules. In addition, it includes the memory timing means 201–30–10 which maintains synchronism between the Memory Module and the Computer Module communicating therewith. Consequently, all subcommands which affect this transfer are issued and controlled by this memory timing means 201–30–10.

The 19-bit G register 201–30–12 receives and contains information which is to be forwarded to the line drivers 201–30–18 after having undergone address manipulation by the adder 201–40–42 of the program processing unit (PPU). It also receives, in addition to the addressing information from the adder, switching orders which indicate the function to be performed and data information from the W register. Parity information which has been created by a parity generator 201–30–114 in response to an activating signal from the W register, is also sent to the aforementioned line drivers. A pair of 8-bit registers labeled separately as an X and a Y register, and referenced together as 201–30–16, provide the means of checking the address to see if it is within certain preset bounds. This is accomplished by a comparator 201–30–20 which compares the address sought by the contents of the G register with the upper and lower address bounds contained in the two 8-bit registers 201–30–16.

Before leaving the Computer Module, it is believed that an operational description utilizing the elements of the module as they would be employed with interrupt processing would benefit this explanation.

The drawings shown in FIGS. 13, 14 and 15 will be referred to and considered as a full drawing of the Computer Module. The registers in the local thin-film memory will be specified by using "identifiers," i.e., BAR, BPR, etc.

After an interrupt condition occurs, the Computer Module must recognize and process the interrupt as quickly as posible. Each interrupt condition sets a specific bit in the interrupt register 201–40–12. After the instruction being performed (when the interrupt occurred) is completed, the Computer Module acknowledges the interrupt condition by entering control mode. The transfer from normal mode to control mode is triggered by receipt of a signal from the control flip-flop (ITE). Thus, recognition of an interrupt condition starts a sequence, the steps of which are described in the following paragraphs.

The contents of the thin-film registers BAR, BPR, and PCR are respectively stored in the ISA, ISP and ISC. The value of the PCR stored is the address of the program word to be executed after returning to the normal operational mode, hence, execution of the interrupted program, or one less than the word to be executed, depending on the syllable being processed at the time of the interrupt. If overlap had occurred, the address contained in the PCR would have been corrected automatically.

The contents of the appropriate program storage register PSR1 or PSR2 are stored in the interrupt program register (IPR). The contents of the control flip-flops necessary to resume operation at the correct syllable in the program are stored in the least significant 16 bits of the IDR (Interrupt Dump Register). The connotation given each bit of the IDR is listed in the following paragraphs.

Bits 1, 2, 3: These bits indicate the address of next PSR syllable. This is an operator syllable since transfer to control mode can occur only at the end of an instruction. The syllables in PSR1 are numbered, from the most significant end of the register, 3–2–1–0; the syllables in PSR2 are similarly numbered 7–6–5–4.

Bit 4: If this bit is a ONE a repeated instruction has been interrupted.

Bit 5: If this bit is a ONE a repeated instruction has been interrupted before execution of its first iteration.

Bit 6: A ONE in this position indicates the PSR1 still contained information after execution of last instruction before interrupt was processed. If bits 6 and 7 are both ONE due to an overlap fill, one of these bits will be reset when restored since overlap will be lost upon return to normal mode.

Bit 7: A ONE here indicates the PSR2 still contained information after execution of last instruction before interrupt was processed. If bits 6 and 7 are both ONE due to an overlap fill, one of these bits will be reset when restored since overlap will be lost.

Bit 8: A ONE in this bit position indicates the POV (overflow) flip-flop is set and its corresponding indicator lit.

Bit 9: A ONE here indicates PUN (underflow) flip-flop is set and indicator lit.

Bit 10: A ONE at this location indicates PNN (not normalized) flip-flop is set and indicator lit.

Bits 11, 12: These bits relate to the contents of the stack counter and indicate which register of stack is located at the top: 0, 1, 2 or 3 (corresponding to position 1–4, respectively).

Bit 13: A ONE herein indicates the Computer Module was operating in control mode.

Bit 14: A ONE here indicates the persent interrupt condition is a primary power failure.

Bit 15: A ONE at this position indicates reverse operation of the stack counter.

Bit 16: A ONE herein indicates the Computer Module was operating in control mode B.

As previously mentioned, the control mode flip-flop is set to indicate the transfer to control mode. This allows the use of certain instructions which are unavailable when operating in normal mode and temporarily prevents the processing of other interrupt conditions with the exception of the two highest priority interrupts: primary power failure and count real time clock.

Further, the contents of the IAR (Interrupt Address Register) are loaded into the BAR and BPR. The IAR can only be loaded in control mode and contains the base address of a table of twelve data words which specify the starting addresses of the routines which service the twelve interrupt conditions. This table is set up by the programmer so that each interrupt condition will be serviced by the proper routine. The programmer is also responsible for writing these sevice routines unless the program is to be run under control of an executive program. Interrupt service routines are similar to a group of subroutines, each of which performs a series of operations to either (a) determine the cause of the interrupt condition and circumvent it; (b) bypass that portion of the program which was interrupted; (c) prestart the program and attempt the suspected section again; or (d) print out an identification of the interrupt and halt.

The memory address of the first location of the interrupt servicing routine for a specific interrupt condition is computed by adding the interrupt number from the table (FIGURE 5) plus 1 to the contents of the interrupt base address register, IAR.

Finally, the bit in the interrupt register 201–40–12 corresponding to the interrupt condition which is to be processed is reset.

The POV, PUN, PNN and all other necessary control flip-flops are then reset to allow the control mode program being executed to use them without first resetting them.

However, if the interrupt was caused by a faulty condition such as POV, PUN, or PNN, those flip-flops causing the interrupt are not reset. The others, however, have their contents stored and are reset so they can be restored when the IRR instruction is executed. Those flip-flops associated with conditions causing the interrupt are reset when the IRR is executed if they have not previously been reset.

Action by the control program in response to an interrupt is therefore usually (other than the first two interrupts noted in FIGURE 5) in the form of a service routine which directs the necessary actions that are to be taken. These service routines are housed in a table in the main Memory Modules and each of the listed interrupt conditions has associated therewith one of the routines located at a corresponding particular address in the stored list.

If no program action is needed in response to an interrupt signal an IRR instruction can be coded into that table location. The following table illustrates typical activities used to service the specified interrupts.

Primary Power Failure (PPF)—Restart any input/output operation impaired by power failure.

External Requests (EXR)—Service external request for Computer attention.

Input/Output Termination (IOT)—Test status in result descriptor for proper termination of input/output operation.

Computer Interrupt (INTC)—Search in job table for task to be performed.

Real Time Clock Overflow (RTC)—Perform operation when specified time interval elapsed.

Write Out of Bounds (WOB)—Test to discover why the effective address is outside the memory bounds.

Illegal Instruction (ILIN)—Start input/output operation when an unused number code causes interrupt.

No Access to Memory (NOAM)—Test to discover why an operand address refers to a memory location not in the system.

Abnormal Condition (ABCN)—Adjust data values because of overflow or underflow.

Halt (HLT)—Perform a control mode operation, such as changing memory bounds.

Snag Bit (SNAG)—Perform program action when lockout from memory word or table occurs.

Parity Error (PER)—Regenerate data because of error in memory word.

The execution of an instruction called the store external request (SER) instruction causes the contents of the interrupt register 201–40–12 to be stored in bits 21 to 32 of the SER instruction store address. This identifies the interrupt signals waiting to be processed.

Figure 16D:
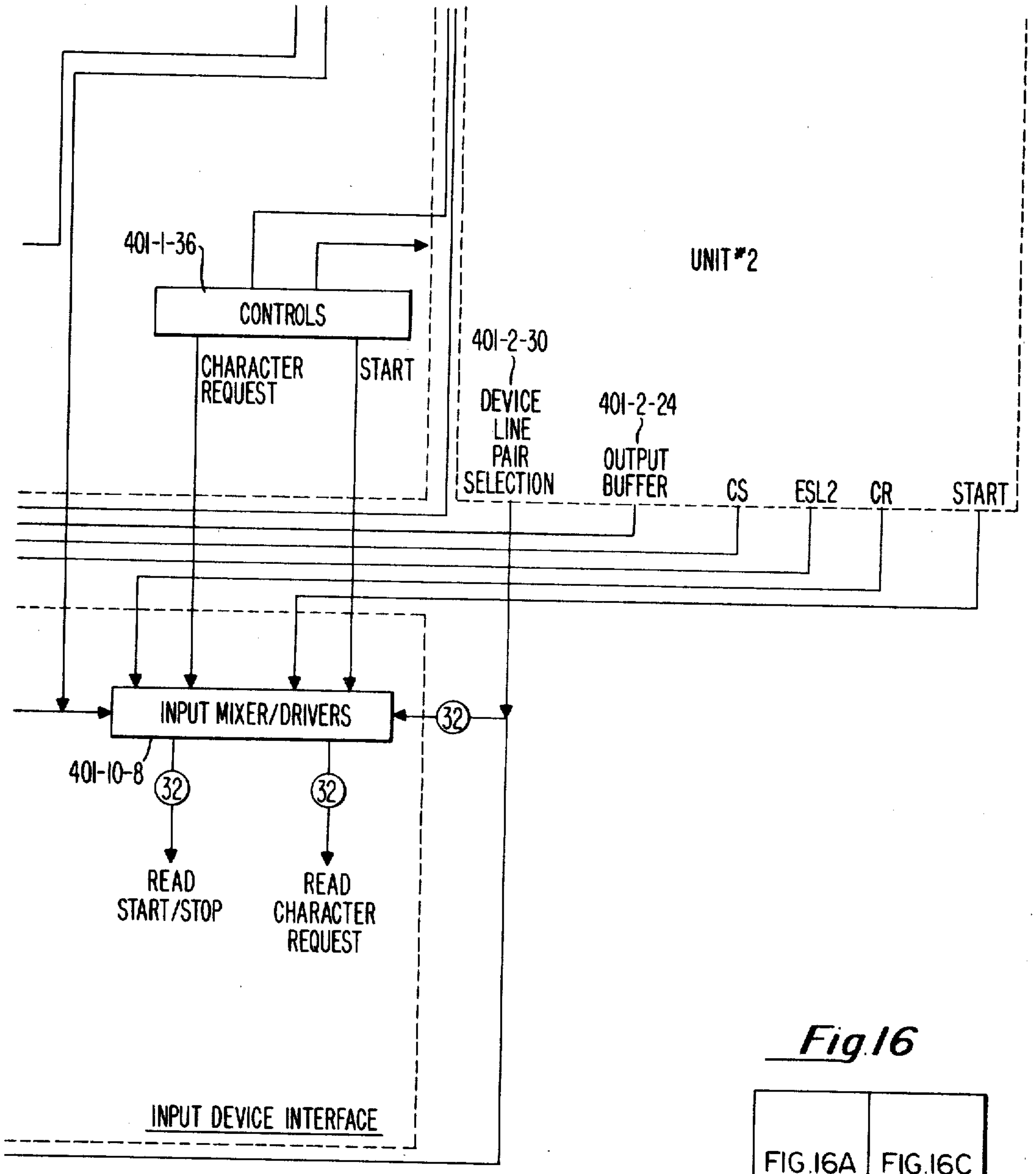
FIG. 16 includes FIGS. 16A, 16B, 16C, and 16D, positioned as shown, and illustrates a detailed block diagram of an I/O Control Module including the first and second I/O control units.
Figure 16:
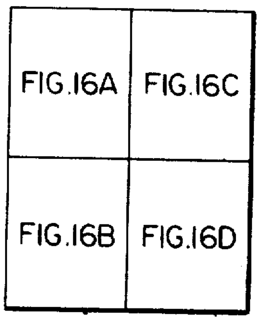
Figure 16A:
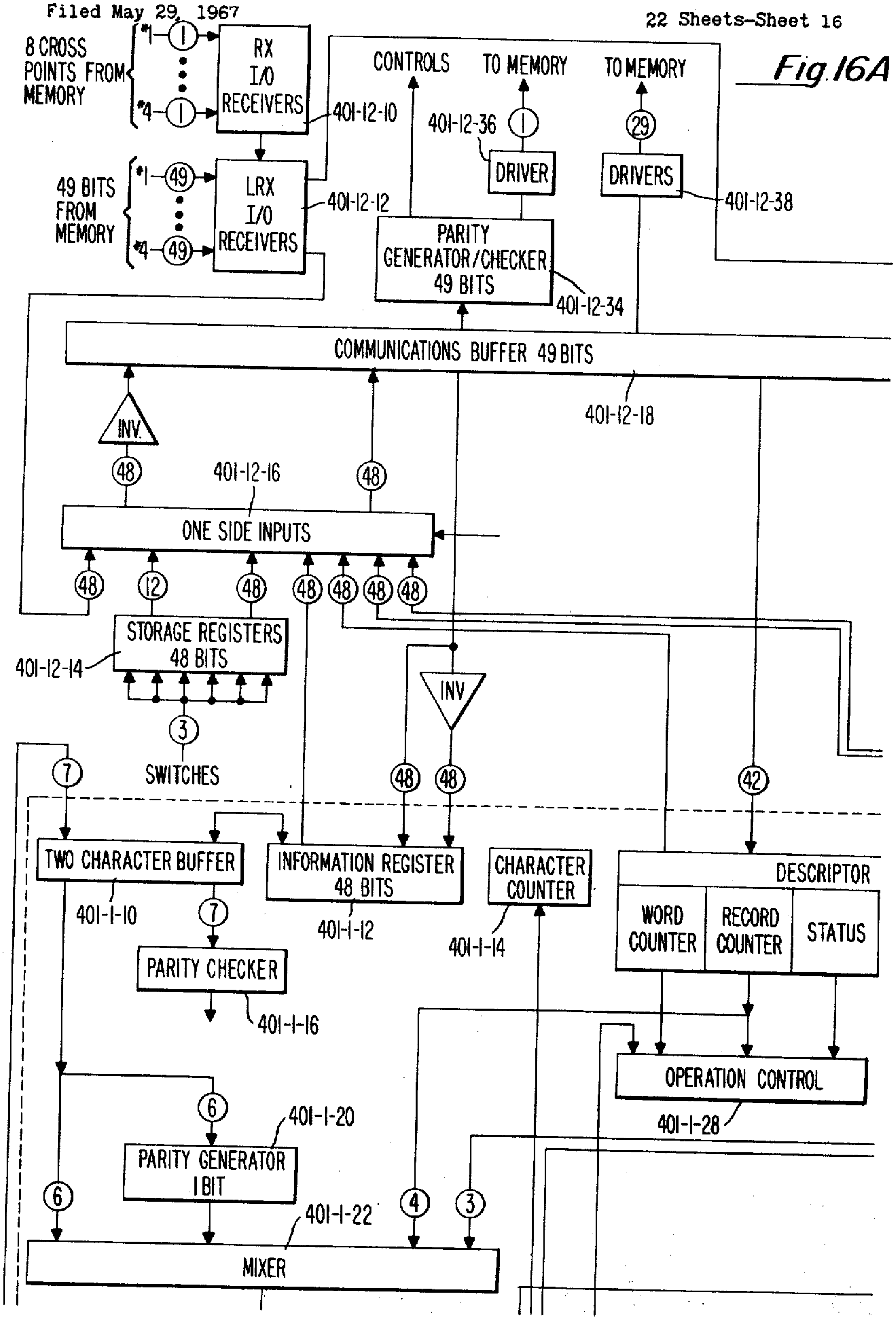
Figure 16B:
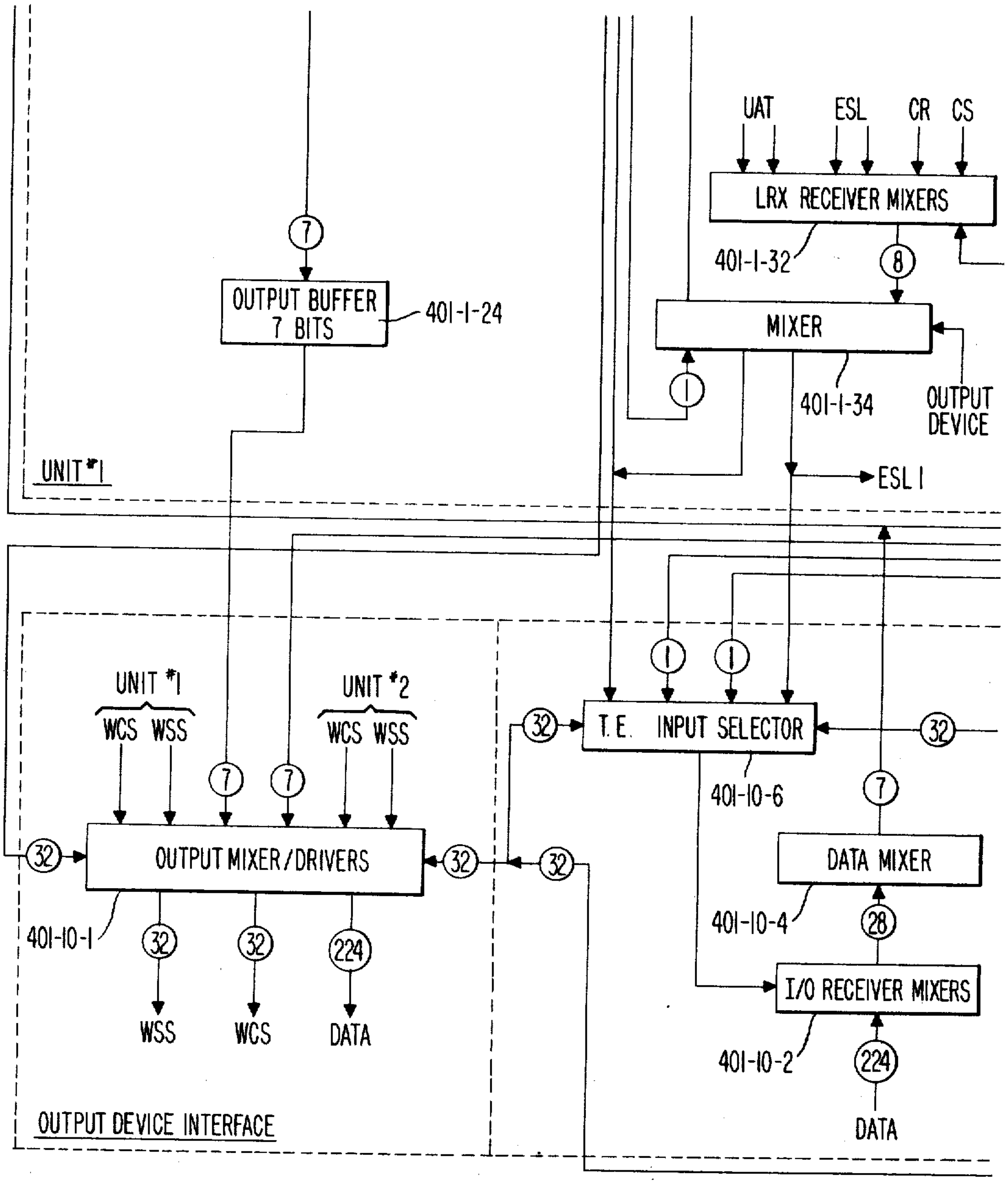
Figure 16C:
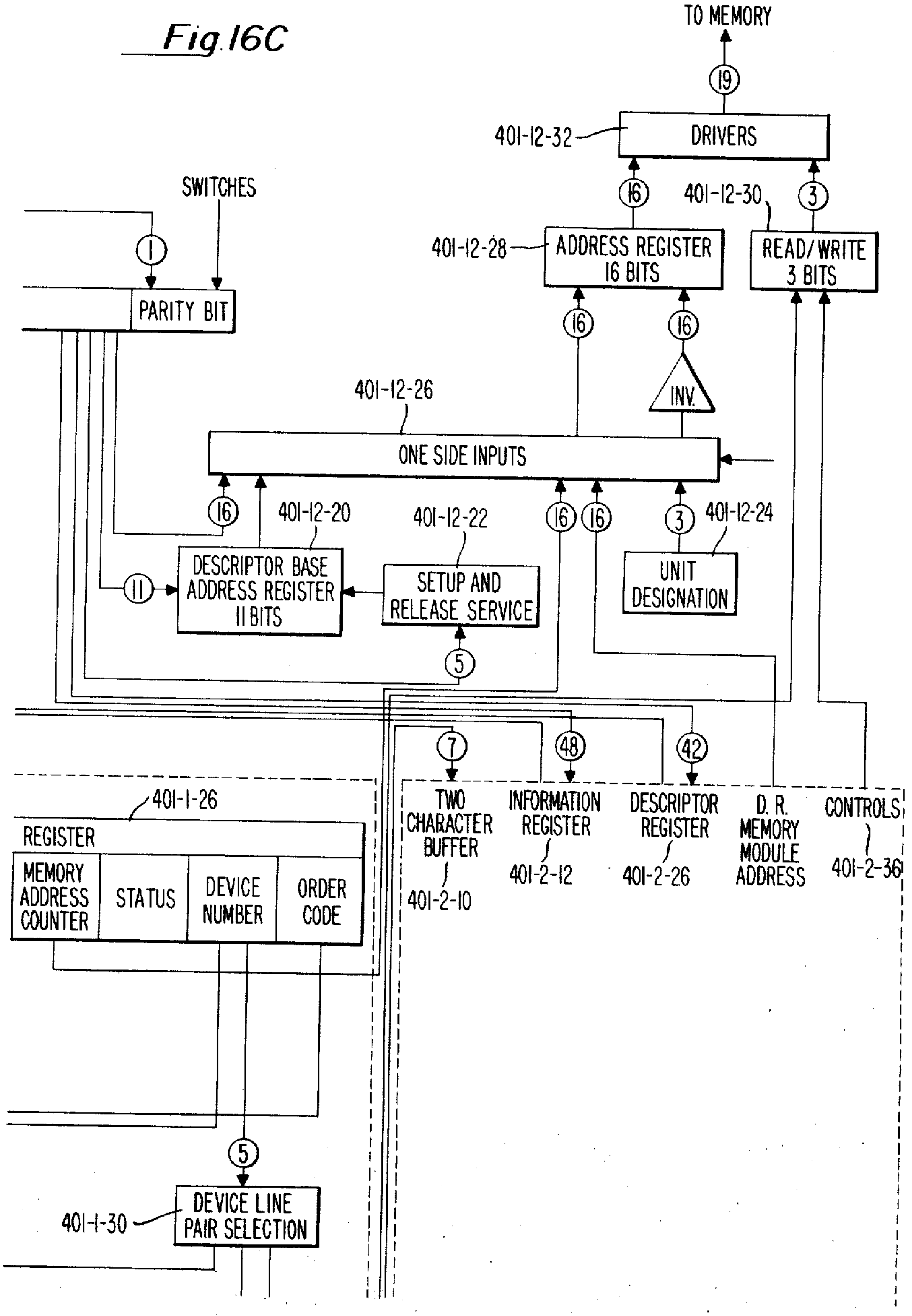

The four FIGURES 16A, 16B, 16C and 16D are combined as shown in FIG. 16 to collectively illustrate a detailed block diagram of a complete Input/Output Control Module cabinet which, as mentioned previously, includes two completely separate I/O control units (#1 and #2) or channels. Thus, in this explanation, a module means a cabinet and these terms are used interchangeably. Likewise, each of the two units within a module is also referred to as a channel or submodule. Earlier in the description of FIGURE 6, the I/O Control Module cabinets 401 were described and the channels or units were referenced therein as 401–1 and 401–2. In addition, the peripheral interface and memory communication portions of the module were referenced as 401–10 and 401–12 respectively. These basic reference numerals are continued in this description of the I/O Control Module cabinet with additional reference numeral portions appended to enable a description of the additional details illustrated in FIGURE 16.

Since all of the ten I/O Control Module cabinets included in the presently disclosed system are identical, it is only necessary to describe a single cabinet. Each cabinet permits input/output operations to be performed concurrently with data processing. It also controls the transfer and format of data between peripheral devices and the main Memory Modules. Input/output actions are initiated by the Computer Module, but, once initiated, operation is under control of the I/O Control Module. Upon completion of the data transfer, all equipment is automatically returned to a state of readiness for new requests, and by means of the system interrupt informs the executive program of the completion of the input/output operation.

Contact between the system memory and each of the I/O Control Modules is maintained through the Memory communication portion of the I/O Module shown at the top of FIG. 16. This portion of the module is commonly shared by both I/O units, as is the peripheral device interface portion, shown at the bottom of the figure. Since both control units are capable of bidirectional operation, any description of the signal flow path through the module must be identified with a particular operation, i.e., input or output. Generally an output operation includes the transfer of memory information data in 48 bit segments or words through the central exchange to the communications buffer register 401–12–18 of the I/O Control Module. From there it is sent to the information register 401–2–12 of unit #2. In either case, the 48 bit word is thereafter transferred in a serial sequence of 6 bit character segments to an output peripheral device under control of the device.

Conversely, an input operation occurs when these characters of information are sequentially transferred from an input peripheral device, assembled into a 48 bit word in one of the information registers 401–1–12 of one or the other of the I/O Control units and thereafter sent to the communications buffer 401–12–18 for transmittal along the lines of the central exchange to a particular memory location. However, since either operation is commenced in the same way, i.e., by a descriptor transfer from the system memory to an I/O Module under orders from a Computer Module, all operations are initiated in the same manner and consequently follow the same pattern.

All Input/Output unit operations are initiated in response to an I/O instruction from a Computer Module processing in its Control A mode. This instruction is referred to herein as "Transmit a descriptor to the I/O" (TIO). It has the following sequence. The Computer Module requests access to a Memory Module. When granted, it causes the transmission of the contents of the memory word location (a descriptor) to the I/O Control Module designated in the order code accompanying the memory request. This initial word enters the descriptor register 401–1–26 by way of the communications buffer register 401–12–18.

Entry into the commonly shared communications buffer register is accomplished through a selective gating device, referred to in FIGURE 16 as one side input means 401–12–16. By selectively gating information into the communications buffer register 401–12–18, this one side input means 401–12–16 enables the buffer register to accept information coming from the memory if an output operation is specified or to accept a character assembled word from one of the information registers 401–1–12, 401–2–12, if an input operation is indicated. The memory information data entering the buffer register 401–12–18 from the one side input means 401–12–16 during an output operation is transferred, in turn, to one or the other of the information registers 401–1–12 or 401–2–12. However, if the transfer from memory involves control data, i.e., a descriptor, then the transfer from the buffer register is to one or the other of the descriptor registers 401–1–26, 401–2–26, regardless of whether it is an input or an output operation.

Data entering the buffer register, whether it is information or control, which is being returned to memory, i.e., input information data or result descriptors, not only travels a different route upon leaving the buffer register, but is handled differently as well.

The different route traveled is from the buffer register to groups of line drivers. One group of such drivers 401–12–38 includes a total of 29 line drivers, while a second group 401–12–32 includes 19 such drivers. A parity driver 401–12–36 is also included and is supplied with a parity signal from the parity generator 401–12–34.

While the drivers 401–12–38 receive their data directly from the buffer register, the 19 line drivers 401–12–32 do not. Of these, 16 drivers are supplied from a second selective gating device, also entitled one side inputs 401–12–26, while the remaining 3 drivers are supplied by a read/write switch 401–12–30 signalling the operation to be performed from control means associated with each unit (#1 and #2).

The 16 line drivers supplied from the one side inputs 401–12–26 are alternately provided with information and control data. Thus, the one side inputs 401–12–26 may selectively gate information to all 16 drivers from the buffer register 401–12–18. This is done when the 16 bit memory address included in the 48 bit contents of the buffer register 401–12–18. However, information combining the 11 bit contents of the descriptor base address register 401–12–20 and the 5 bits identifying the peripheral device requiring setup or release service 401–12–22 may also be supplied to these 16 line drivers.

The instructions contained in the descriptor word housed in each of the descriptor registers 401–1–26 and 401-2–26 are only symbolically referred to in FIG. 16, since they have been more fully explained in the prior portion of this specification devoted to the descriptor types and their functions. It is believed sufficient here to note that the descriptor word contains the current peripheral device number, the external device operation code, the number of records to be processed, the memory location to be used and the I/O operational status field. Descriptor decoding 401–1–28 and appropriate control logic means 401–1–36 are associated with this descriptor register as they are with the instruction register in the Computer Module previously described. Thus, the peripheral device to be utilized for this operation is chosen by the device line pair selection means 401–1–30 in response to the 5-bit identification signal from the descriptor register 401–1–26. Status information ESL from both input and output peripheral devices enters the unit through the LRX Receiver mixers 401–1–32, as does information from both types of devices regarding the unit's availability (UA).

Since the unit must determine this information from the devices, it requires means to impose certain control signals upon the characters sent to such devices. Thus, for input peripheral devices, this control is provided by the mixer 401–1–34, while for output devices, mixer 401–1–22 supplies this need.

Each I/O Control Module communicates with the terminal equipment (peripheral devices) through input and output interface circuitry. The output interface circuitry comprises a plurality of mixer/drivers 401–10–1, which includes the decoding, mixing and driving elements for all lines from the I/O module to the peripheral devices. This output circuitry also requires receivers for the character request signal from the device. The input interface circuitry, on the other hand, comprises not only plurality of receiver means 401–10–2, but also requires input driving means 401–10–8 and input selection means 401–10–6. The input signals are multiplexed into the I/O control units through the receiver mixers 401–

10–2 where they are selectively gated through the data mixer 401–10–4 and then into the two-character buffer of the appropriate control unit. The two-character buffer 401–1–10 is an additional two-character register coupled to the information register to provide intermediate storage for the last two characters of the eight-character word. The two-character buffer 401–1–10 operates, during an output operation, as follows: As the sixth character is transferred from the register, simultaneously therewith a parallel transfer of the seventh and eighth characters into the two-character buffer is effected. Thus, at this point, the information register is available for the next word transfer from the communications buffer 401–12–18, even though the seventh and eighth characters have not as yet been transferred to the peripheral device. It is seen, therefore, that each I/O control unit has the ability to provide an operational overlap between the information being transferred and the information being utilized.

This two character buffer is also operational during an input sequence. In this mode it operates to serially accept the first two characters of the next word being transferred from the peripheral device during the time period that the previously assembled word in the information register is being shifted through the communications buffer and into the main memory. During this time period, therefore, the I/O unit is performing two functions simultaneously to provide the operational overlap.

The input and output device interface portions shown at the bottom of FIGURE 16 each includes an interconnection cable having 224 lines and referenced as data. This connection is comprised of 32 groups of 7 lines each to provide the 6 bit character and the one parity bit. Each 7 line group together with a 5 line group of control lines forms a separate cable. This physical configuration has been previously discussed and will not be further described; however, the signals upon these lines have not been specified previously. They will now be described as they relate to the three basic types of peripheral devices, namely, the simple input, the simple output, and the complex peripheral device.

The simple input device provides the following ten output signals. It should be noted that although they are specified as output signals of the device, they are input signals to the I/O unit of FIGURE 16. In other words, in the previous description the signals were directionally specified with reference to the device itself. However, in the following description of the individual peripheral device, the signals will be directionally specified with reference to the device itself.

(1) *Unit Available* (UA).—A binary "1" level signal on this line indicates that the device is capable of transferring information and is not connected to any I/O unit. The device transmits a "0" level whenever it cannot transfer data or within 1.0 microsecond after the I/O unit attempts to initiate an operation with either the read start/stop or the read character request lines emanating from the input mixer drivers 401–10–8.

(2) *Character Strobe* (CS).—The occurrence of a "1" level signal from a simple input peripheral device is a command to an I/O unit to interrogate the data lines for a data character. This signal (CS) enters the I/O unit through the LR–X Receiver/Mixer 401–1–32. The character strobe does not precede data inputs to the I/O unit. The input device generates a character strobe signal as quickly as possible after receiving a "1" level signal on the read start/stop signal line. Thereafter, the device generates a character strobe signal as quickly as possible after receiving a "1" level on the character request line. The character strobe signal is maintained at the "1" level for a minimum of 0.39 microsecond at the I/O unit. When at the "0" level, the "0" level is maintained for a minimum of 0.39 microsecond at the I/O unit. The maximum repetition rate of the character strobe signal is .75 megapulse per second.

(3) *Data* (*7 lines total, 6 data, one parity*).—The input device generates seven data output signals, six of these represent the character and the seventh is generated to make the overall parity odd. Data signals exist at the start of the binary "1" level of the character strobe signal. They remain for a minimum of 0.75 microsecond thereafter for the high priority I/O unit and a minimum of 1.10 microseconds for the other I/O unit in the module cabinet. Data signals may be transmitted any time after the transition of the read start/stop signal from the "0" to the "1" level and subsequently upon receipt of a character request signal within the timing limitation specified for the character strobe signal. The data lines are numbered 1 to 7 with 1 the most significant data bit and 7 the parity bit.

(4) *Status*.—The status signal is functionally identical to the character strobe signal. The presence of either the status signal or character strobe signal indicates that valid signal levels exist on the data lines. The timing specifications given for the character strobe signal applies equally to the status strobe signal. When the status signal is at the "1" level, the data lines feeding information to the I/O unit from a simple input device contain a special status code which indicates the occurrence of a significant event. The status signal levels exist on the data lines at the start of the "1" level on the status line. They remain there for a minimum of 1.10 microseconds for either I/O unit. Timing for the status signal levels assumes that peripheral devices do not simultaneously raise their character strobe and status strobe signals. The signals are considered simultaneous when the leading edges of the two pulses have not more than a .38 microsecond separation.

The following status codes are used by the peripheral devices of the present system. These codes appear on the 7 data lines #1 to #7 as shown and defined below.

STATUS CODES

Signals on Data Lines 123–456–7

X00–000–1—This status code is used by a simple input device which detects a "1" level on its character request line and a "0" level on its read start line to determine if the device shall execute a read operation or a control operation. For a read operation, the I/O unit will respond within 2.67 microseconds with a "1" level on the read start line and will set the descriptor order code field, bits 46–48, to 101. If the simple input device does not receive a "1" level on the read start line within 2.67 microseconds, it will send a terminating status to the I/O unit and execute the specified control operation.

X00–000–X—This status code is used by an input device transferring data to cause the I/O unit to store a partial word of at least one character in memory. The more significant character positions of the partial word will contain delete characters (all ones). If the I/O unit is processing the last word, the receipt of this status will cause the I/O unit to store the partial word in memory and then terminate with end of word status (011–000) in the status register.

X01–000–X—This status code is used by the input device to cancel a partial word sent to the I/O. When the I/O unit detects this status condition, it places delete characters in its data buffers and resets its character counter.

X10–000–X—This status code causes the I/O unit to count the word and address fields of the descriptor in reverse order.

X11–000–X—This status code causes the same effect as is obtained by transmitting the two previous status codes serially.

X00–001–X—This status code is used by a device reading by record to interrogate the Record Count field in the I/O unit. Upon receiving this status code signal, the I/O unit will store a word of at least one character in memory as described above, reset the character counter to zero and decrement the record counter. If the I/O unit was processing the last word or if the status caused the record counter to go to zero, the I/O unit will end the operation with end of record status (000–001) in the status field.

X00–X1X–X, 000–1XX–X—These status codes are used by the device to indicate an error or end of operation condition and are referred to as terminating status conditions. The interpretation of the code is unique for each device. In all cases the I/O unit will transfer with leading delete characters the contents of its data buffers to memory and terminate the operation with code from the device data lines 4, 5 and 6 set in the result descriptor status field, bits 20, 37, and 38.

The simple input device accepts as input signals the following two output signals from the input mixer/driver 401–10–8. The two lines carrying these signals are also identified by an abbreviation of their name.

(1) Read Start/Stop (RSS)

The signal transition from "0" to "1" level on this line shall indicate that the input device has been connected to an I/O unit and the I/O unit is ready to accept the first character. The transition to the "1" level will occur at the start of the operation only if the device is transmitting a "1" level on its unit available (UA) line. If on the read character request (RCR) line, the transition to the "1" level on the read start will occur within 2.67 microseconds in response to the status code signal X00–000X. This signal transition from "1" to "0" level indicates that the input device has been disconnected from the I/O unit. This transition will occur whenever a status code is inserted into the status field.

(2) Read Character Request (RCR)

The signal transition to the "1" level indicates that the device should interrogate the I/O unit with the status code signal X00–00X to determine whether the input operation requested is a read operation or control operation. If the operation requested is a read operation, he I/O unit will place a "1" level on the read start/stop line within 2.67 microseconds. Data transfer will then take place. If the I/O unit does not transmit a "1" level on the read start/stop line within 2.67 microseconds, a control operation will be executed. The device must then transmit a terminating status code to acknowledge the instruction. This implementation exhausts the simple binary coding possibilities of the two lines carrying information from the I/O unit to the input device for device instruction variations.

If the signal level on the read start line is already at the binary "1" level when the character request line level is shifted there, this indicates that an I/O unit has successfully received a character and is ready to accept the next character. If the data transfer as specified by the word count of the command descriptor is completed by the transmission of a character, the I/O unit will acknowledge successful transmission of the character with a "1" level on the character request line but will end the operation only when the read character request signal will be maintained at the I/O unit for a minimum of 0.333 microsecond. The normal response of the character request signal will occur at the input device for devices connected to the high priority I/O unit of the I/O control module with less than 50 feet of cable within 0.49 microseconds after the "0" to "1" transition of the character strobe line at the input device. For those devices connected to the remaining or low priority I/O unit with less than 50 feet of cable, the normal response of the character request signal will occur at the input device within .49 to 1.67 microseconds after the "0" to "1" transition of the character strobe line at the input device. The I/O unit maintains a "1" level on the character request line until the transition to the "0" level on the character strobe line. The response of the I/O unit to the character strobe with a "0" to "1" transition of the character request from the I/O unit is an indefinite time; therefore, the device is prepared to wait for this response. The input device uses the character request signal as an indication that an I/O unit has accepted the character and to transmit the next character strobe signal.

The signal transition of the character request line to the "1" level occurs in response to a non-terminating status signal. This signal occurs when the character request line is at the "0" level. The normal response of the character request line to a non-terminating status occurs at the input device for devices connected to either I/O unit with less than 50 feet of cable. It occurs within .49 and 1.67 microseconds after the "0" to "1" transmission of the character strobe line at the input device.

Similarly, the 32 cables interconnecting the output peripheral devices with the output interface portion of each of the I/O Control Modules are comprised of the same plurality of lines capable of carrying identical signals therebetween. The following description refers to each of these signals and their relationship to an output peripheral device.

For the I/O unit to start an output peripheral device, a "1" level must be present on the unit available line coming from the device. The I/O module begins the operation by transmitting an instruction character to the terminal device over the 7 data lines going to the device. At the same time it requests a word from memory. The output peripheral device responds to the transmission of the instruction character by changing the binary signal on its unit available line from "1" to "0." When the I/O unit receives the first word from memory, the I/O unit will signal the output device with a "1" level on the write start/stop line. The I/O module will continue to transfer the instruction character over the data bit lines until a receipt of a "1" level on the character request line from the device. As soon as a character request signal is received, the I/O unit places a data character on the data lines and signals the output device of the transfer over the character strobe line. The I/O module continues to respond to each character request from the output device until the binary signal on the Write Start/Stop (WSS) line from the output mixer/drivers 401–10–1 goes to a "0" level.

The simple output device provides the following three input signals to the I/O units. Note, however, that as to the peripheral device, they are output signals.

(1) *Unit Available*.—A "1" level on the unit available line from the simple output device signifies to the I/O unit that the device is capable of accepting information and is not connected to another I/O unit. Conversely, it is understood that a device transmitting a "0" level on the unit available line is either connected to another I/O unit or is not ready for data transfer. After the I/O unit attempts to connect to the peripheral device by transmitting the instruction character, the unit available signal will fall to a "0" level within 1.0 microsecond. The unit available signal will remain at the "0" level until the I/O unit transmits a "0" level on the write start/stop line and the peripheral device is ready to accept information.

(2) *Character Request*.—The transition to the "1" level on the character request line occurs whenever the write start line from the I/O unit is at the "1" level and the device is ready to receive a six bit character from the I/O unit. The character request line shall remain at the "1" level for a minimum of 0.39 microsecond in duration at the I/O unit. Upon receipt of a signal on the character request line, the I/O module will respond with a signal on its character strobe line and with legitimate data on its data lines. The "0" level of the character request line shall be maintained for a minimum of 0.39 microsecond at the I/O unit. The maximum repetition rate of the character request signal is 0.75 megapulse per second.

(3) *Status.*—A binary signal "1" level on the status line indicates that either parity error was found on a character received from the I/O unit or the device has experienced some sort of malfunction. This binary signal "1" level on the status line is maintained for a minimum of 0.39 microsecond at the I/O Modules. The order code of 000–010 is loaded into the status register and the I/O Module terminates the operation and transmits a binary signal "0" level on the write start/stop line. The existence of a binary "0" level on the status line, however, indicates that the operation is proceeding normally.

The I/O unit provides the following input signals to a simple output peripheral device. Note here again that although they are referred to as input signals to the peripheral device, they are output signals from the system.

(1) *Write start/stop.*—A binary "1" level on the write start/stop line is sent to the simple output device after the I/O Module is connected to the device via the instruction character and the I/O unit has received the first word from memory to be transferred to the device. The receipt of a binary "1" level on the write start/stop line causes the device to start sending character request signals to the I/O unit. A binary "1" level will remain on the write start/stop line until a terminating status condition occurs in the I/O unit or is received from the terminal device. The occurrence of a status code in the status field of the descriptor will cause the I/O unit to disconnect from the peripheral device by transmitting a binary "0" level on the write start/stop line.

(2) *Character Strobe.*—The I/O unit places a "1" on the character strobe line for a minimum of 0.33 microsecond at the I/O unit in response to a binary "1" level signal on the character request line from the device. Within 20 nanoseconds after this signal transition of the character strobe line, a valid data character exists on the six data lines at the I/O unit. For those devices connected to the I/O Module with less than 50 feet of cable, this response normally occurs at the output device between 0.49 and 1.33 microseconds after the time the character request signal goes to a binary "1" level. The peripheral device will wait indefinitely for a character strobe response. After its arrival, the character strobe signal will remain at the binary "1" level until the signal on the character request line goes to the binary "0" level. The peripheral device will then transmit its next character request signal and the above sequence will be repeated. Communication between the output peripheral device and the I/O unit over the character request and character strobe lines will occur only when the write start/stop line is at the binary "1" level.

(3) *Data.*—The operative I/O unit will transmit a seven-bit data character to the output peripheral device within 20 nanoseconds after the signal on the write character strobe line goes to a binary "1" level. The six-bit data character remains valid for a minimum of 1.33 microseconds the length of time of course, will depend on the rate of transfer of the character request signals from the output peripheral device. The data character is transmitted on lines numbered 1 through 6 with the signal on line 1 being the most significant bit. The bit on line 7 is generated such that the overall parity is odd.

For at least 1.5 microseconds prior to the signal transition from a binary "0" to a binary "1" level on the write start/stop line, the data lines are used to transfer specific bits of the command descriptor to the peripheral device as the instruction character. The peripheral device uses this 7 bit instruction to modify its operations. The Record Count field, bits 13–16 of the descriptor, is transmitted on data lines 7, 1, 2 and 3. The Order Code field, bits 46–48 of the descriptor is transmitted on data lines 4, 5 and 6. The transmission of this instruction is maintained after the signal transition to the binary "1" level of the write start/stop line until the I/O unit receives a "1" level on the write character request line from the device.

A complex peripheral device is started and operated in the following manner:

First, the I/O unit will attempt to initiate only those complex devices whose unit available line has a binary signal at the "1" level. Next, the I/O unit will try to connect to the device by transmitting an instruction character on the data lines to the complex peripheral device in the manner described for a single output device. The device will respond to the transmission of the instruction character by lowering its unit available line.

After the complex peripheral device has received the instruction from the I/O unit, one of the following three operations may take place. They are:

(1) A complex input operation requiring only one instruction character.

(2) A complex input operation requiring more than one instruction character.

(3) A complex output operation.

An example of a complex peripheral device is a unit well known in the data processing art as a Flexowriter. It is also an example of a device whose input operation requires only one character of instruction. Within 0.67 microsecond after the instruction character is placed on the data lines to the device, the I/O unit transmits a binary signal "1" level on the read start/stop line. The instruction character contained in the command descriptor remains on the data lines for the duration of the operation. Data transfer proceeds in the manner described for a simple input peripheral device except that on the last character of the last word as determined by the character counter and the word count field in the command descriptor, the I/O Module will indicate to the device that it has accepted this last character. It does this by transmitting a binary signal "1" level on both its read character request and its write character strobe lines. It maintains a binary signal "1" level on its start/stop line until the device either returns a binary signal "0" level on the read character strobe line for this last character, or loads a terminating status condition in the status field of the result descriptor.

A magnetic tape is an example of a complex peripheral device whose input operation requires more than one character of instruction. The operation of this device is initiated and proceeds in the same way as the simple output operation previously described. When the device has obtained the required number of instruction characters, it sends a status signal 100–000–X to the I/O unit. The I/O unit responds to this status signal by transmitting a binary signal "0" level on the write start/stop line, a binary signal "1" level on the read start/stop line, and placing the instruction character contained in the descriptor on the 7 data lines. When the device recognizes the binary "1" level on the read start/stop line, the operation proceeds as just described for a complex input device.

The third operation listed above takes place when a complex peripheral device is initiated like a simple output device. This operation may proceed in two different ways depending on whether bit 46 in the 48 bit descriptor word is a binary "1" or a binary "0." If a bit 46 of the command descriptor word is a binary "0," the data transfer proceeds like a simple output device except for the last character of the last data word to be transferred. This is determined by the character and word count fields of the command descriptor word. The I/O unit will indicate to the peripheral device that it is transmitting this last character by placing a binary signal "1" level on both the write character strobe and the read character request lines. The I/O module will maintain a binary signal "1" level on the write start/stop line until the peripheral device transmits a binary signal "0" level on the write character request line for the last character or until a terminating status condition is loaded in the status field of the descriptor. If bit 46 of the command descriptor is a "1," the data transfer generally proceeds like a simple output device. However, when the last character of the word is transmitted and the least significant 8 bits of the word count field in the descriptor word are zero, the procedure is slightly different. When the I/O unit transfers this last character, it signals the complex peripheral device by transmitting a "1" level on both the write character strobe and the read character request lines. The peripheral device can determine if this simultaneous receipt of binary signal "1" levels indicates that the I/O unit is transferring the last character of the word by returning a status signal 000–000–X to the I/O unit. If the I/O unit is not processing the last word (i.e., the word count does not equal zero), the read character request line will go to the binary "0" level and the operation will continue. If the I/O unit is processing the last word (i.e., the word count does equal zero), the read character request will remain at the binary "1" level. When this happens the peripheral device terminates the operation by either placing a "0" level on the write character request line or by transmitting a terminating status code to the I/O unit.

The following three output signals from the complex peripheral device are provided as input signals to the I/O Module. They are:

(1) *Unit Available.*—A binary signal "1" level on the unit available line from the complex peripheral device signifies that it is ready for use and is not presently connected to another I/O unit. Conversely, if the peripheral device provides a binary "0" signal level on the unit available line, it is either connected to another I/O unit or it is not ready for data transfer. When the I/O unit attempts to connect to the peripheral device by transmitting the instruction character, the binary signal "1" level on the unit available line will fall to a binary "0" level within 1.0 microsecond. Thereafter, the unit available signal will remain at the binary "0" level until the I/O unit transmits a "0" binary signal on the write start/stop or read start/stop line.

(2) *Write Character Request/Read Character Strobe (WCR/RCS).*—On a complex input device the line carrying this signal performs the same function as the line that carries the character strobe signal for the simple input device. For a complex output device, this line functions the same as the line which usually carries the character request line for a simple output device.

Whenever a complex device detects a binary signal "1" level on both the write character strobe line and the read character request line from the I/O Module, the device must be prepared to maintain a binary signal "1" level on the WCR/RCS line until it has completed its communication with the I/O unit. If the device has not sent a terminating status while holding WCR/RCS at the "1" level, the I/O unit, upon receipt of a "0" level on the WCR/RCS line will continue to process words so long as the word count is not zero. However, it will terminate when the word count reaches zero.

(3) *Status Line.*—The description and use of the status signal for a simple input device also applies to the complex device. Similarly, for a complex device connected for an input operation, practically all of those status codes previously defined for a simple input operation also apply to the complex input operation.

When a complex device is connected for an output operation, the status codes are transmitted to the I/O unit on the data lines and their meanings are as follows:

COMPLEX DEVICE STATUS CODES FOR OUTPUT OPERATION

Signals on data lines 123–456–7

000–000–X.—This status code is used by those complex peripheral devices whose command descriptor has a binary signal "1" in bit 46 to differentiate between the end of the operation and the end of a record. When the device simultaneously detects the presence of a "1" level on both the write character strobe and the read character request lines, it will maintain the "1" level on the write character request line and meanwhile signal the I/O unit on the status line with the code 000–000–X on data lines to determine if the concurrent signals mean end of operation or end of record. If the read character request line goes to the "0" level within 2.0 microseconds and remains there until the status line has a correspondingly binary "0" signal thereon, the peripheral device then prepares to accept another record. If the read character request line remains at the "1" level rather than going to the "0" level, the peripheral device will prepare to end the operation. When this occurs the I/O module will disconnect from the device within 1.0 microsecond after the signal on the write character request line has switched to the binary "0" level.

001–000–X.—This code is used to reject the present contents of the I/O unit data buffers and to request access to the next memory location. The contents of this new memory location are then loaded into the data buffers, the character count returned to "0," and the output transfer resumed.

010–000–X.—This code is used by the complex peripheral device to count the word counter and address counter field of the descriptor in reverse order.

011–000–X.—This status code accomplishes the same purpose as that achieved by transmitting the two previous status codes serially.

100–000–X.—This status code is used to cause the I/O Module to connect to the complex device for an input operation. The receipt of this status code signal causes the I/O unit to place a binary "0" signal level on the write start/stop line and a binary "1" level on the read start/stop line to the device and to thereafter proceed like an input device.

11X–000–X.—This code is not used.

1X1–000–X.—This code is not used.

XXX–XX1–X, XXX–X1X–X, XXX–1XX–X. — These status codes are used by the device to indicate an error or end of operation condition and are terminating status conditions for the complex output operation. In all cases the I/O unit will terminate the operation with the code from the data lines 4, 5 and 6 set into the result descriptor status field, bits 20, 37 and 38. The characters remaining in the I/O unit data buffers when this status code occurs are not transmitted to the device. The interpretation of the status codes are unique for each device.

(4) *Data.*—The description and use of the data lines to the I/O for a simple input device applies to the complex device when one is connected to the I/O unit for an input operation. The complex device so connected for an output operation uses the data lines only to transmit status conditions to the I/O unit.

A complex peripheral device receives the following group of five signals as output signals from the data processing system.

(1) *Write Start/Stop.*—The I/O unit places a "1" on the write start/stop line to the peripheral device whether the operation to be performed is a complex output operation or a complex input operation which requires further instruction characters. This latter operation occurs whenever the I/O Module is connected to the device by the transmittal of the instruction character contained in the descriptor and the first word has been received from memory. The write start/stop line is at the "1" level during all data transfers, and remains there until a terminating status signal or a convert to input operation status signal is sent by the complex peripheral device or a condition occurs in the I/O unit which changes the status of the unit. The occurrence of either a terminating signal, a conversion signal or a status condition signal will cause the I/O unit to transmit a "0" level on the write start/stop line.

(2) *Read Start/Stop.*—A signal transition on this line from the binary "0" to the binary "1" level notifies the peripheral device that it has been connected to the I/O unit as a complex input device and the I/O unit is ready to accept the first data character. This signal transition to the "1" level occurs within 0.67 microsecond from the time the instruction character is placed on the data lines, provided the unit available line from the device is at the "1" level, or in response to the status code 100–000–X from a complex device which is connected to the I/O unit as an output device. The signal transition from the "1" to the "0" level indicates that the complex device has been disconnected from the I/O unit. The transition to the "0" level is caused by a status condition generated within the I/O or by a terminating status transmitted from the device to the I/O.

(3) *Write Character Strobe.*—The use and description of the write character strobe for a simple output device applies for the complex device which is connected to the I/O unit for an output operation or for an input operation which requires further instruction characters. In addition, to the function described for the simple output device, when the I/O unit is connected to a complex device in the manner described above, the write character strobe is used to indicate successful response by the I/O unit to a non-terminating or control status from the complex device. The timing specification for the response of the read character request to a status signal for the simple input operation also applies to the response of the write character strobe to a status signal.

When the complex device is connected as an input device, the transition to the "1" level on the write character strobe line is a signal to the device that the I/O unit has accepted the last character for data transfer specified by the character counter and the word count field of the descriptor. This transition to the "1" level will occur at the I/O unit within 20 nanoseconds of the transition to the "1" level on the read character request which acknowledges to the device the successful transmission of the last character. The write character strobe line will remain at the "1" level until the read character strobe line from the device goes to the "0" level or the operation is ended by a terminating status condition.

(4) *Read Character Request.*—The use and description of the read character request for a simple input device applies for the complex device which is connected to the I/O unit for an input operation.

When the I/O unit and the complex device are connected for an output operation, the transition of the read character request to the "1" level will occur at various times depending on whether or not bit 46 of the descriptor is a one or a zero. If bit 46 of the descriptor is "0," this transition will occur whenever the last character of the last word as determined by the character counter and the word counter is being transferred to the device. If bit 46 of the descriptor is "1," this transition will occur on the last character of the word transmitted every time the least significant eight bits of the word count field in the descriptor is zero. The transition to the "1" level in either case occurs at the I/O unit within 20 nanoseconds of the transition to the "1" level of the write character strobe line for that character. In either case, the read character request will remain at the "1" level until the write character strobe goes to the "0" level. However, if the word count is not zero, the read character request will go to the "0" level for the duration of status level if the device transmits the status code 000–000–X.

(5) *Data.*—The use and description of the data lines for a simple output device applies to the data lines from the I/O unit to the complex device which is connected for an output operation.

When the complex device is connected for an input operation, the instruction character of the command descriptor is transmitted over the output data lines for the duration of the operation. If the device is connected for an output operation, or an input operation which needs additional instruction characters, the instruction character contained in the descriptor is transmitted over the output data lines until the receipt of the first character request from the complex device. In the latter case after the additional characters have been received and the status is sent from the complex device to convert the operation to an input operation, the instruction character contained in the descriptor is placed on the output data lines for the remainder of the operation.

Figures 17, 17A:
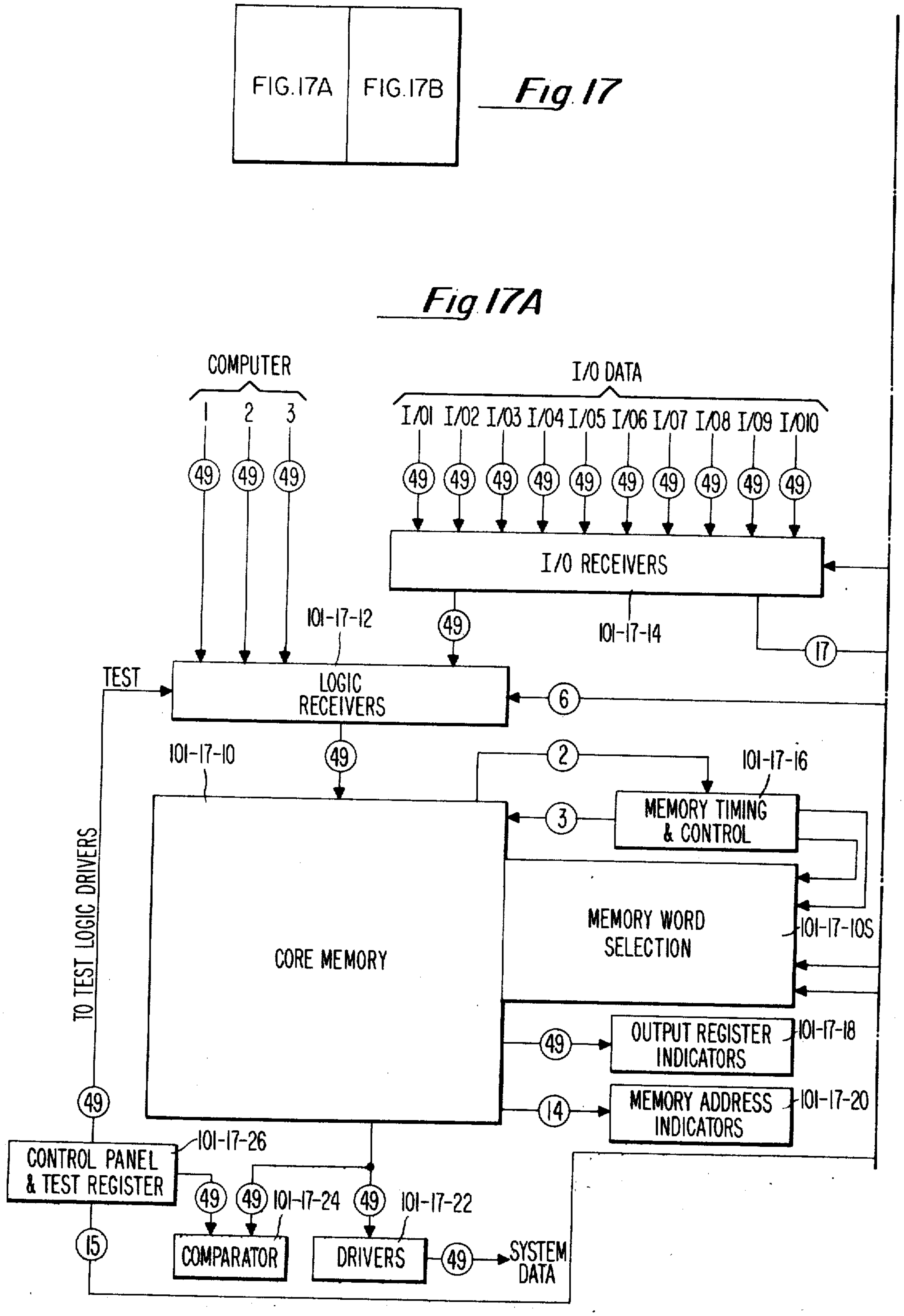
FIG. 17 includes FIGS. 17A and 17B to illustrate a detailed block diagram of an individual main Memory Module as used in the present system.
Figure 17B:
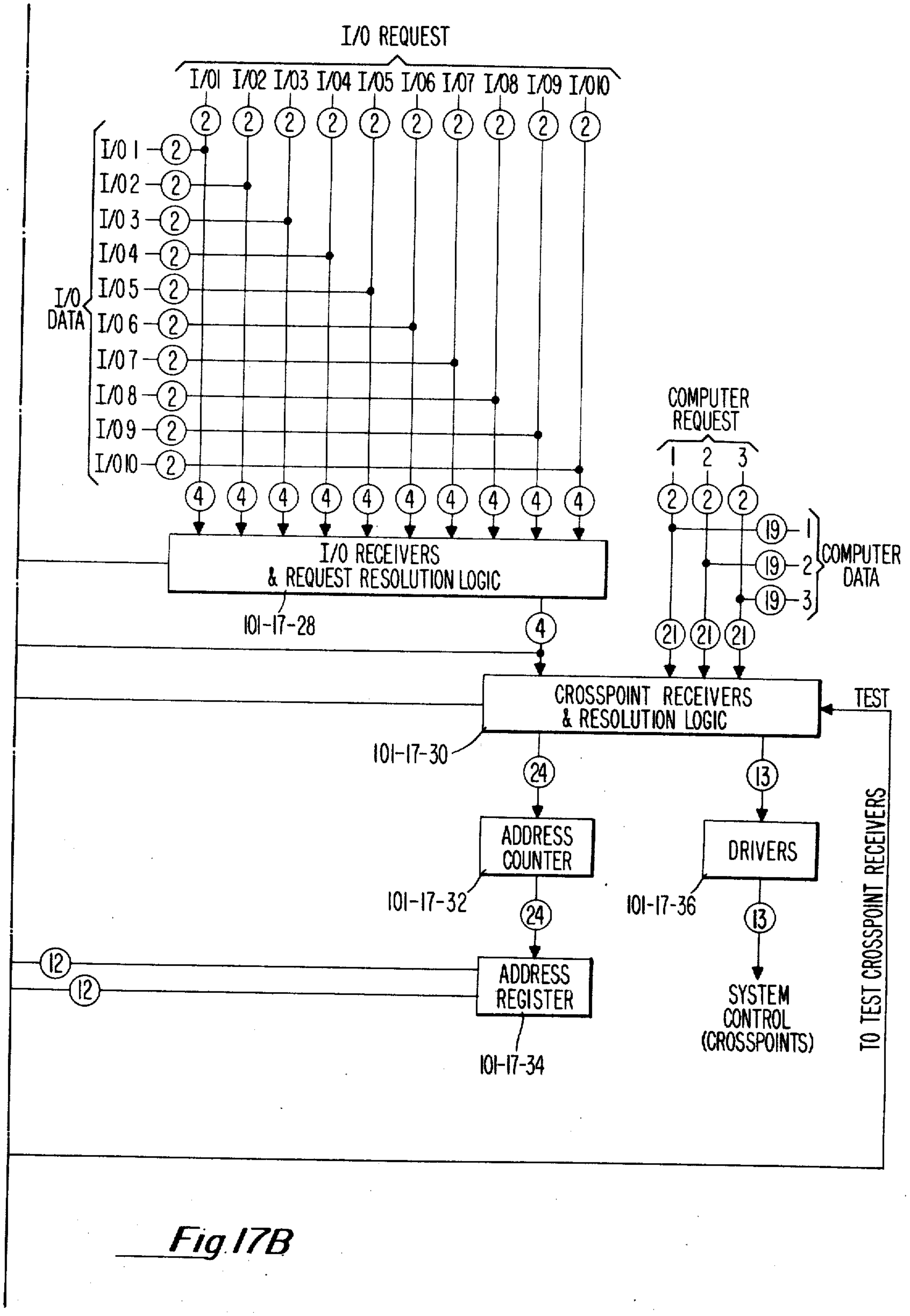

FIGURE 17 includes FIGURES 17A and 17B. It illustrates a logical block digram of the Memory Module used in the present system. There are four such modules in the disclosed configuration. Each module includes a core memory 101–17–10 having a capacity of 16,384 words. Each word is 49 bits long including a parity bit and each word is separately addressable. This selection is accomplished by the memory word selection means 101–17–10S. In the upper left hand portion of the FIGURE 17, a plurality of 49 line cables enter the module. One of the input information cables arrives from each of the remaining thirteen modules of the system. The group of three 49 line cables respectively arriving from each of the three Computer Modules are coupled directly into the logic receivers 101–17–12. However, the group of ten 49 line I/O data cables coming from each of the I/O Control Modules are first fed into the I/O Receivers 101–17–14, prior to the arrival of one of them into the logic receivers 101–17–12. The particular cable of the ten to be selected for connection into the logic receiver is accomplished by the request resolution logic 101–17–28. Entering this logic circuitry are a plurality of ten 4 line cables. One of these four line cables is connected to the Memory Module from each of the ten I/O Control Modules. Each of these cables includes two pairs of line groups. One of the pairs in each cable is denoted I/O data and the remaining pair is specified as I/O request. These connotations are believed to be self-explanatory in that the respective groups merely denote that data is to be supplied to the memory from the respective I/O Control Modules or one of the Modules requests access to the Memory Module.

Thus, the cables in the upper right hand portion of the figure illustrate the conflict resolution means which provides the determination of the particular module to be granted access to this Memory Module.

In the case of Computer Module access conflict, a somewhat different scheme of resolution is provided. In this event, the crosspoint resolution communication is accomplished by a 21 line cable from each of the three Computer Modules. Two lines in each of the three cables denotes the Computer Module request lines, while the remaining 19 lines of the 21 line cable are denoted computer data. The three 21 line cables enter the crosspoint receivers and resolution logic 101–17–30 from the Computer Modules. In addition, a fourth 21 line cable also enters this circuitry. This fourth cable is comprised of four lines from the I/O Receivers and Request Resolution logic 101–17–28 and 17 lines from the I/O Receivers 101–17–14. A Control Panel and Test Register 101–17–26 also provides a test signal to test the crosspoint receivers 101–17–30.

From this resolution circuitry 101–17–30 a 6 line cable is connected to the logic receivers to provide the necessary gating signals for entry of the data.

A separate group of 13 lines is connected to the thirteen line drivers 101–17–36 whose outputs are used to provide control (crosspoint) information to the remainder of the system.

A cable having 24 lines is connected to the address counter 101–17–32 to provide the address of the selected word in the core memory 101–17–10. This address information is first stored in the address register 101–17–34 prior to its use by the memory word selection means 101–17–10S.

A separate 49 line output cable is coupled to a plurality of output register indicators 101–17–18 from the core memory 101–17–10. Similarly a separate 14 line cable is coupled to a plurality of memory address indicators 101–17–20 to provide an indication of the particular word addressed in the memory.

The actual selected word output is applied to a plurality of 49 line drivers 101–17–22 whose output is applied to the system data lines.

This same word output is also applied to a comparator 101–17–24 wherein it may be compared with a word stored in the test register 101–17–26.

A memory timing and control circuit 101–17–16 is also included to provide the necessary timing associated with the core memory. It receives signals from and applies signals to both the core memory 101–17–10 and its word selection means 101–17–10S.

FIGURES 18A and 18B taken together provide a table of the complete instruction repertoire of this machine. The table alphabetically lists assembly language mnemonics and machine language syllable formats.

The syllable program (machine language) instructions generated by the assembler are composed of strings of from one to seven syllables, depending on the instruction being performed. The syllable string representing one instruction follows the last syllable of the preceding instruction, permitting program memory areas to be used with maximum efficiency. Each program word contains four syllables; a maximum-length, seven-syllable instruction may overlap up to three program words.

A knowledge of syllable programming is necessary for the system programmer to change assembled programs, read assembly listings, and analyze memory dumps. Hence, no explanation of such programming will be attempted, since it is not considered necesary to the comprehension of this description.

A list of symbol designation appears below in the FIGURE 18B to aid in the understanding of the instructions shown in the table.

Obviously many modifications and variations of the present invention are possible in the light of the above teachings. It is, therefore, to be understood that within the scope of the appended claims the invention may be practiced other than as specifically described and illustrated.

What is claimed is:

1. A modular data processing system comprising a plurality of high speed memory modules, a plurality of input/output control modules individually connected to each of said memory modules, a plurality of computing modules also individually connected to each of same memory modules, and a plurality of peripheral devices connected to said input/output control modules, each of said input/output control modules including a pair of identical input/output control units and a memory communication unit selectively connected to each of said pair of control units to enable each of said units to individually communicate with each of said memory modules on an alternate basis while the pair of units are simultaneously communicating with a pair of said plurality of peripheral devices.

2. The modular data processing system as set forth in claim 1 above wherein each of said input/output control modules also includes an input peripheral device interface means and an output peripheral device interface means with each of said interface means commonly connected to both of said input/output control units.

3. The modular data processing system as set forth in claim 1 wherein each of said memory modules includes a high speed word organized magnetic core memory stack, and a plurality of communication cables connected between said memory modules and the remaining modules of said system, said plurality of cables being equal in number to the tool pluralities of said input/output control modules and said computing modules.

4. A modular data processing system comprising a plurality of high speed memory modules, a plurality of input/output control modules individually connected to each of said memory modules, a plurality of computing modules also individually connected to each of said memory modules, and a plurality of peripheral devices including input and output devices, each of said input/output control modules including a pair of input/output control units, a memory communication unit, and an input/output peripheral device interface unit, each of said pair of control units being connected to said memory communication unit, with said communication unit, in turn, being connected to each of the memory modules to provide said individual connection thereto, and said input/output interface unit connected between both of said control units and all of said plurality of peripheral devices.

5. A modular data processing system comprising a plurality of memory modules, a plurality of central processing modules and a plurality of input/output control modules, each of said central processing modules and each of said input/output control modules being connected to each of said memory modules to enable individual selective connection therebetween, each of said central processing modules including a program processing unit, an arithmetic unit, a memory control unit and a thin film memory unit, said program processing unit being connected for bidirectional communication with each of the remaining units in said processing module, and said program processing unit and said memory control unit being further connected to each of the memory modules in the system for bidirectional communication therewith.

6. In a modular data processing system having a main memory, a central processing module comprising: a program processing unit, a memory control unit, a thin film memory unit and an arithmetic unit, said program processing unit being connected to each of the remaining units in the module for bidirectional communication therebetween, said processing module further including a first connection means for bidirectional information data transfer between said main memory and said processing module and a second connection means for bidirectional control data transfer between said memory and said module.

7. The modular data processing system as set forth in claim 6 wherein said program processing unit includes means for receiving and transmitting data while simultaneously performing processing operations on different data to thereby enable successive program steps to overlap.

8. In a modular data processing system having a main memory and a plurality of input/output peripheral devices; an input/output control module comprising: a main memory communicating unit connected to said main memory for bidirectional data transfer therewith, a first input/output control units, a second input/output control each capable of being selectively connected to said communication unit for bidirectional data transfer therewith, an input peripheral device interface unit connected between all of the input devices of said plurality of peripheral devices and both said first and said second input/output control unit, and an output peripheral device interface unit similarly connected between all of the output peripheral devices and both of the input/output control units.

9. A modular data processing system having at least one main memory module, at least one central processing module and at least one input/output control module, each of said central processing modules and each of said input/output control modules connected to each of said main memory modules, each of said central processing modules having a plurality of separate operational units including: a program processing unit, a memory control unit, an arithmetic unit and a thin film memory unit, said program processing unit connected to each of the remaining units in the processing module, each of said input/ output control modules also having a plurality of separate operational units including: a memory communicating unit, a first and a second input/output control unit, an input peripheral device interface unit and an output peripheral device interface unit, each of the input/output control units connected to the memory communicating unit, and each of the interface units connected to each of the input/output control units in the input/output module.

10. A modular data processing system comprising a plurality of high speed memory modules, a plurality of input/output control modules individually connected to each of said memory modules, a plurality of computing modules also individually connected to each of said memory modules, and a plurality of peripheral devices including input and output devices connected to said input/output control modules, each of said computing modules including means for interrupting the normal processing operational mode of said computing module with further means for causing said computing modules to perform in a first interruptive control mode and including still further means for interrupting the first interruptive control mode and for causing said computing modules to perform in a second interruptive control mode.

11. The modular data processing system as set forth in claim 10 wherein means are included in each of said input/output control modules and in each of said computing modules for activating the interrupting means included in each of said computing modules and for causing the interrupted computing module to perform in said first and in said second interruptive control mode.

12. The modular data processing system as set forth in claim 10 wherein said still further means for interrupting the first interruptive control mode and causing said computing module to perform in a second interruptive control mode is responsive solely to signals associated with errors occurring during its operational performance in said first interruptive control mode.

13. A modular data processing system comprising a plurality of interconnected functional modules, including central processing memory and input/output control modules with a plurality of input and a plurality of output peripheral devices associated therewith, each of said central processing modules further comprising a program processing unit, a thin-film memory unit, an arithmetic unit and a memory control unit, said program processing unit being connected for bidirectional communication with each of the remaining units in the central processing module, each of said input/output control modules further comprising a memory communication unit, a first and a second input/output control unit, and input peripheral device interface unit and an output peripheral device interface unit, said memory communicating unit connected to said first and second input/output control unit to enable bidirectional communication to and from each of said control units, said input peripheral device interface unit connected between said input peripheral devices and said first and said second input/output control units to enable selective communication between one of said input peripheral devices and one of said input/output control units and said output peripheral device interface unit similarly connected between said output peripheral devices and said first and said second input/output control units to enable similar selective communication therebetween.

14. A modular data processing system comprising a plurality of functional modules, including at least one central processing module, at least one high speed ferrite core memory module, and at least one input/output control module with a plurality of input and a plurality of output peripheral devices associated therewith, each of said central processing modules further comprising a program processing unit, a magnetic thin-film memory unit, an arithmetic processing unit and a memory control unit, said program processing unit being connected for bidirectional communication with each of the remaining units in the central processing module, said program processing unit and said memory control unit being further connected to each of said memory modules for bidirectional communication therewith, each of said input/output control modules still further comprising a memory communication unit, a first and a second input/output control unit, an input peripheral device interface unit and an output peripheral device interface unit, said memory communicating unit connected between said memory modules and said first and second input/output control units to enable bidirectional communication between each of said control units and said memory module, said input peripheral device interface unit connected betwen said input peripheral devices and said first and said second input/output control units to enable selective communication between one of said input peripheral devices and one of said input/output control units and said output peripheral device interface unit similarly connected between said output peripheral devices and said first and said second input/output control units to enable a similiar selective communication therebetween.

References Cited

UNITED STATES PATENTS

| | | | |
|---|---|---|---|
| 3,048,332 | 8/1962 | Brooks et al. | 235—157 |
| 3,117,306 | 1/1964 | Reitfort | 340—172.5 |
| 3,200,380 | 8/1965 | MacDonald et al. | 340—172.5 |
| 3,251,041 | 5/1966 | Chu | 340—172.5 |
| 3,274,554 | 9/1966 | Hopper et al. | 340—172.5 |
| 3,274,561 | 9/1966 | Hallman et al. | 340—172.5 |
| 3,278,906 | 10/1966 | Gountanis et al. | 340—172.5 |
| 3,302,182 | 1/1967 | Lynch et al. | 340—172.5 |
| 3,319,226 | 5/1967 | Mott et al. | 340—172.5 |
| 3,337,853 | 8/1967 | Harrand | 340—172.5 |

RAULFE B. ZACHE, Primary Examiner